US012253244B2

(12) United States Patent
Del Ninno et al.

(10) Patent No.: US 12,253,244 B2
(45) Date of Patent: Mar. 18, 2025

(54) LED LIGHT ASSEMBLY WITH BENT PCB

(71) Applicant: JumpLights, Inc., Gaithersburg, MD (US)

(72) Inventors: Matteo Power Del Ninno, North Bethesda, MD (US); John Rupp Peeler, Clarksburg, MD (US)

(73) Assignee: JumpLights, Inc., Gaithersburg, MD (US)

( * ) Notice: Subject to any disclaimer, the term of this patent is extended or adjusted under 35 U.S.C. 154(b) by 0 days.

(21) Appl. No.: 17/819,555

(22) Filed: Aug. 12, 2022

(65) Prior Publication Data

US 2023/0045981 A1 Feb. 16, 2023

Related U.S. Application Data

(60) Provisional application No. 63/232,390, filed on Aug. 12, 2021.

(51) Int. Cl.
*F21V 23/00* (2015.01)
*F21V 29/51* (2015.01)
*F21V 29/83* (2015.01)
*F21Y 115/10* (2016.01)

(52) U.S. Cl.
CPC ............ *F21V 23/005* (2013.01); *F21V 29/51* (2015.01); *F21V 29/83* (2015.01); *F21Y 2115/10* (2016.08)

(58) Field of Classification Search
CPC .......... H05K 2201/10106; F21V 29/70; F21V 29/83; F21V 23/005
See application file for complete search history.

(56) References Cited

U.S. PATENT DOCUMENTS

| | | | | |
|---|---|---|---|---|
| 8,485,691 | B2 | 7/2013 | Hamel et al. | |
| 8,757,847 | B2 | 6/2014 | Seff et al. | |
| 9,392,682 | B2 | 7/2016 | Yang | |
| 9,488,359 | B2 * | 11/2016 | Le | F21V 29/00 |
| 9,644,828 | B1 | 5/2017 | May | |
| 10,066,813 | B2 | 9/2018 | Poorter et al. | |
| 10,091,855 | B2 | 10/2018 | Van Winkle | |
| 10,119,661 | B2 | 11/2018 | May | |
| 10,845,013 | B2 | 11/2020 | Tolen et al. | |
| 10,896,897 | B2 | 1/2021 | Shao et al. | |
| 11,129,276 | B2 | 9/2021 | Iedema et al. | |
| 11,227,853 | B2 | 1/2022 | Israel et al. | |
| 2012/0033420 | A1 | 2/2012 | Kim et al. | |
| 2012/0075854 | A1 * | 3/2012 | Maxik | F21K 9/90 29/832 |

(Continued)

FOREIGN PATENT DOCUMENTS

| | | |
|---|---|---|
| WO | 2014094049 | 6/2014 |
| WO | 2019215750 | 11/2019 |

(Continued)

*Primary Examiner* — Tracie Y Green
*Assistant Examiner* — Michael Chiang
(74) *Attorney, Agent, or Firm* — Studebaker Brackett PLLC

(57) ABSTRACT

A light fixture, including: a printed circuit board (PCB) extending in a first direction, the PCB includes bends along one or more sides extending in the first direction for rigidity; the PCB configured to transfer thermal heat directly to ambient air; and one or more groups of light emitting diodes (LEDs) operatively coupled to a component-side of the PCB and between the bends.

19 Claims, 21 Drawing Sheets

(56) References Cited

U.S. PATENT DOCUMENTS

| | | | | |
|---|---|---|---|---|
| 2016/0003463 | A1* | 1/2016 | Rodinger | F21K 9/23 362/249.02 |
| 2016/0252240 | A1 | 9/2016 | Lee | |
| 2016/0341412 | A1 | 11/2016 | Lee | |
| 2018/0010775 | A1* | 1/2018 | Sung | H05K 1/056 |
| 2018/0209636 | A1* | 7/2018 | Sohn | F21V 21/30 |
| 2018/0363893 | A1* | 12/2018 | Cheng | F21V 29/74 |
| 2019/0032859 | A1* | 1/2019 | Novak | F21K 9/278 |
| 2020/0292138 | A1* | 9/2020 | Crayford | F21K 9/235 |
| 2021/0048185 | A1* | 2/2021 | Kuzhikkali | F21V 29/70 |
| 2021/0155155 | A1 | 5/2021 | Havemann | |
| 2022/0390076 | A1* | 12/2022 | Heijmans | H05K 1/0278 |

FOREIGN PATENT DOCUMENTS

| | | |
|---|---|---|
| WO | 2021007449 | 1/2021 |
| WO | 2021083733 | 5/2021 |
| WO | 2021148279 | 7/2021 |

* cited by examiner

1000

1500

1700

LED LIGHT ASSEMBLY WITH BENT PCB

CROSS-REFERENCE TO RELATED APPLICATIONS

This application claims priority to U.S. Provisional Patent Application Ser. No. 63/232,390 filed Aug. 12, 2021, which is incorporated in its entirety by reference.

BACKGROUND

LED light bars are rows of glowing LED lights. LED light bars offer a brighter, wider, and peering beam of light. Light bars are useful for providing illumination to an area such as downlighting or high bay lighting. No ballast or voltage change is needed, so the LED light bars complement most systems. Heat is diverted rearward, so the lenses do not burn on touch, and light bars are durable to impact.

LED Arrays are clusters of LED packages or dies constructed through several methods. Each method depends on the fashion and extent to which the LED semiconductor producer packages the LED chips. Package LEDs includes an optical lens, bonding wires, electrodes, and resins to shelter the LED. They are referred to as T-Pack LEDs and are fastened to a heat sinking substrate via “through hole” mounting (surface mounting).

BRIEF DESCRIPTION OF THE DRAWINGS

Aspects of the present disclosure are understood from the following detailed description when read with the accompanying FIGS. In accordance with the standard practice in the industry, various features are not drawn to scale. In some embodiments, dimensions of the various features are arbitrarily increased or reduced for clarity of discussion.

DETAILED DESCRIPTION

Figure 1:
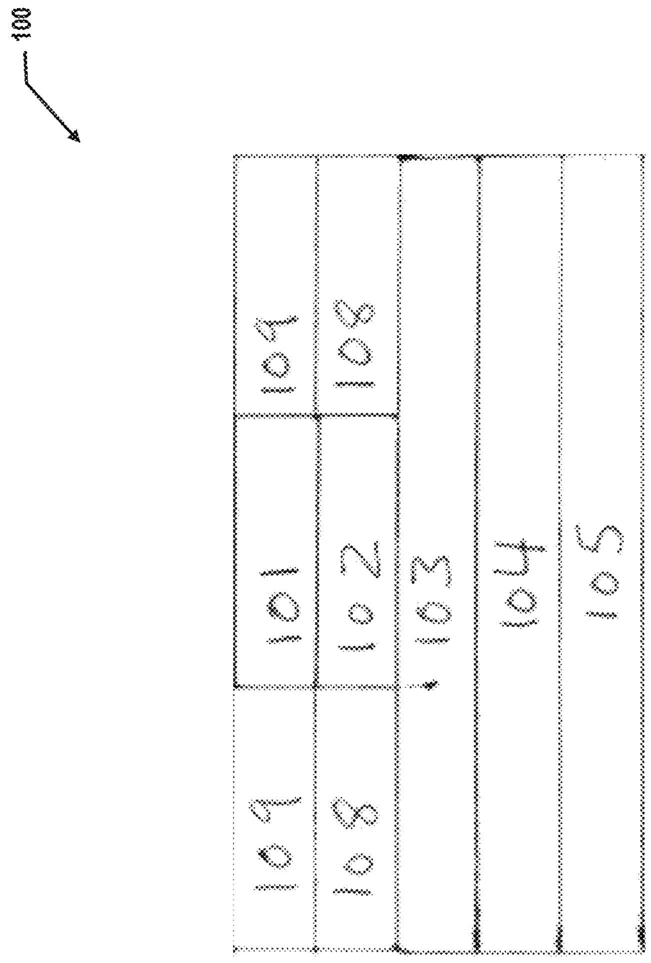
FIG. 1 is a block diagram of a printed circuit board assembly (PCBA) LED light assembly, in accordance with some embodiments.

The following disclosure provides many different embodiments, or examples, for implementing different features of the discussed subject matter. Examples of components, values, operations, materials, arrangements, or the like, are described below to simplify the present disclosure. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, the present disclosure repeats reference numerals and/or letters in the various examples. This repetition is for the purpose of simplicity and clarity and is unintended to dictate a relationship between the various embodiments and/or configurations discussed.

Further, spatially relative terms, such as “beneath,” “below,” “lower,” “above,” “upper” and the like, are used herein for ease of description to describe one element or feature’s relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, an LED light assembly is configured to use holes included in a printed circuit board assembly (PCBA) for air flow, metal bending techniques, and/or geometric placement of LEDs, to reduce production materials, reduce weight of the PCBA, improve structural rigidity, and effectively disperse/remove heat created by the LEDs. In some embodiments, the PCBA is further configured to use components, such as heat pipes, to transfer heat away from heated zones where heat is created by the LED pools.

In other approaches, LED lights are configured to use a printed circuit board (PCB) that is populated with LEDs to form a PCBA. This assembled PCB is then attached to a heat sink and a lens is attached to cover the LEDs. In some instances, the whole LED light is then inserted into a lighting fixture.

A PCB or printed wiring board (PWB) is a laminated sandwich structure of conductive and insulating layers. PCBs have two complementary functions. The first is to affix electronic components in designated locations on outer layers by soldering. The second is to provide reliable electrical connections (and reliable open circuits) between the component's terminals in a controlled manner often referred to as PCB design. Each of the conductive layers is designed with a pattern of conductors (like wires on a flat surface) that provides electrical connections on the conductive layer. Another manufacturing process adds vias (plated-through holes that allow interconnections between layers).

PCBs mechanically support electronic components using conductive pads in a shape designed to accept the component's terminals, and further electrically connect them using traces, planes and other features etched from one or more sheet layers of copper laminated onto and/or between sheet layers of a non-conductive substrate. Components are generally soldered onto (or otherwise affixed to) the PCB to both electrically and mechanically connect to the PCB.

In some embodiments, PCBs are single-sided (one copper layer), double-sided (two copper layers on both sides of one substrate layer), or multi-layer (outer and inner layers of copper, alternating with layers of substrate). Multi-layer PCBs allow for a higher component density because circuit traces on the inner layers are unable to take up surface space between components.

A heat sink (or heatsink) is a passive heat exchanger that transfers the heat generated by an electronic or a mechanical device to a fluid medium, often air or a liquid coolant, where the heat is dissipated away from the device, thereby allowing regulation of the device's temperature. In some embodiments, a heat sink includes active components such as a fan, pump, or the like to improve the heat transfer rate.

A heat pipe is a heat-transfer device that employs phase transition to transfer heat between two solid interfaces. At the hot interface of a heat pipe, a volatile liquid in contact with a thermally conductive solid surface turns into a vapor by absorbing heat from that surface. The vapor then travels along the heat pipe to the cold interface and condenses back into a liquid, releasing the latent heat. The liquid then returns to the hot interface through either capillary action, centrifugal force, or gravity and the cycle repeats.

Due to the high heat transfer coefficients for boiling and condensation, heat pipes are effective thermal conductors. The effective thermal conductivity varies with heat pipe length, and can approach 100 kW/(m·K) for long heat pipes, in comparison with approximately 0.4 kW/(m·K) for copper In other approaches, a separate metal backing is joined to the PCBA to provide rigidity, thermal dissipation, and act as a receptacle for attaching a lens. Further, in these other approaches, a thermal interface material (TIM) is used between the PCBA and the metal backing.

The TIM is a material inserted between two components to enhance the thermal coupling between the components. A common use is heat dissipation, in which the TIM is inserted between a heat-producing device (e.g., an integrated circuit) and a heat-dissipating device (e.g., a heat sink). At each interface, a thermal boundary resistance exists to impede heat dissipation. In addition, the electronic performance and device lifetime degrades dramatically under continuous overheating and large thermal stress at the interfaces.

In some embodiments, an LED light assembly is configured to use the PCBA as the source of thermal dissipation (that is, the heat sink and the TIM are removed from (or are unnecessary in) a final PCBA) and the PCBA is bent to provide rigidity of the PCBA allowing for the removal of a separate metal backing and thermal interface tape (TIM). A substantial reduction of materials compared to other approaches is realized.

Further, the bending of the PCBA metal substrate reduces warping caused by gravity. The bending of the PCBA allows the PCBA to be used without the separate metal backing. In some embodiments, the PCBA is affixed to a mechanical structure for hanging (e.g., from a ceiling) and power connection purposes (e.g., to power the PCBA). The bending of the PCBA prevents the PCBA from deforming due to the pull of gravity, when the PCBA is hanging from a mechanical structure.

In some embodiments, the number of materials used to create an LED light assembly is substantially reduced in comparison with other approaches.

FIG. 1 is a block diagram of a printed circuit board assembly (PCBA) LED light assembly 100, in accordance with some embodiments.

Led light assembly 100 includes one or more LEDs 101, a solder joint 102 operably coupling LED component 101 to a metal foil 103, a dielectric material 104 buffering the metal foil 103 and a substrate 105, and a solder mask 108 that includes in some embodiments a silkscreen 109. In some embodiments, silkscreen 109 is applied directly to substrate 105 and/or dielectric material 104.

PCBA LED light assembly 100 is constructed without a lens in contrast to other approaches. This is beneficial as lenses hold heat close to the PCBA assembly and a heat sink is needed to dissipate this heat. Thus, PCBA LED light assembly 100 reduces the materials (which reduces the materials and cost to manufacture), and eliminates heat trapped within a lens cover.

In some embodiments, a small amount of conformal coating (i.e., a thin polymeric film which conforms to the contours of a PCB to protect the board's components; not shown) is applied to PCBA LED light assembly 100, to cover an upper portion of LEDs 101 but not enough to obstruct light output. In at least one embodiment, the conformal coating is applied to cover an exposed portion of foil 103 and solder joint 102 without being taller than the top of component 101. In some embodiments, a bend 626 (FIG. 6) is applied to PCBA LED light assembly 100 affecting components 103-105 and 108-109, which increases the rigidity of PCBA LED light assembly 100.

PCBA LED light assembly 100, in contrast to other approaches, is without TIM (e.g., adhesive, tape, or thermal compound) which normally buffers substrate 105 from a metal backing that functions as a heat sink, a mechanical support for the PCBA, and a coupler or connector for a lens. The TIM and the metal backing are left out of PCBA LED light assembly 100. By eliminating the TIM and metal backing, PCBA LED light assembly 100 provides a reduced thermal resistance (a measurement of a temperature difference by which an object or material resists a heat flow) between substrate 105 and the ambient air around PCBA LED light assembly 100. Additionally, in comparison to other approaches using a thermoplastic backing, at least one embodiment of PCBA LED light assembly 100 does not include such backing and thereby provides a reduced thermal resistance between substrate 105 and the ambient air around PCBA LED light assembly 100. In at least one embodiment, substrate 105 of PCBA LED light assembly 100 provides a direct thermal transfer route to ambient air. In comparison, other approaches provide one or more indirect thermal transfer routes to ambient air via different material connections. Further still, other approaches provide a thermal transfer route to non-ambient air in a space enclosed by a substrate and a cover or lens over the light emitting component on the substrate. Further, PCBA LED light assembly 100 has fewer parts in contrast to other approaches, which reduces the weight of PCBA LED light assembly 100 as well as the cost, number of overall components and complexity, time to assemble the assembly, and materials to thermally transfer heat. Additionally, there is no additional equipment (e.g., screws, clips, or other like devices) to mechanically affix substrate 105 to the metal backing. In at least one embodiment, the lack of additional equipment also results in fewer elements subject to failure, e.g., tape, paste and screws which might mechanically or thermally fail are removed/reduced.

PCBA LED light assembly 100 includes a bendable substrate 105 coupled to dielectric material 104 and a layer of copper foil 103 laminated to dielectric material 104. Chemical etching divides copper foil 103 into separate conducting lines called tracks or circuit traces, pads for connections, vias to pass connections between layers of copper, and features such as solid conductive areas for electromagnetic shielding or other purposes. The tracks function as wires fixed in place and are insulated from each other by air and substrate 105. In some embodiments, PCBA LED light assembly 100 includes a coating (not shown) that protects copper foil 103 from corrosion and reduces the chances of solder shorts between traces or undesired electrical contact with stray bare wires.

In some embodiments, PCBA LED light assembly 100 includes multiple layers of copper foil 103 arranged in pairs. In some embodiments, PCBA LED light assembly 100 is a two-layer board having copper foil 103 on both sides. Surface mount components, such as LEDs 101 are attached by their leads to copper foil 103 on the same side of PCBA LED light assembly 100.

A trace pattern is etched into copper foil 103 using photoresist which is coated onto substrate 105, then exposed to light projected on the pattern. The resist material protects the copper from dissolution into the etching solution. The etched board is then cleaned. Substrate 105 includes a silkscreen 109 used as a legend identifying the components, test points, or identifying text.

Figure 2:
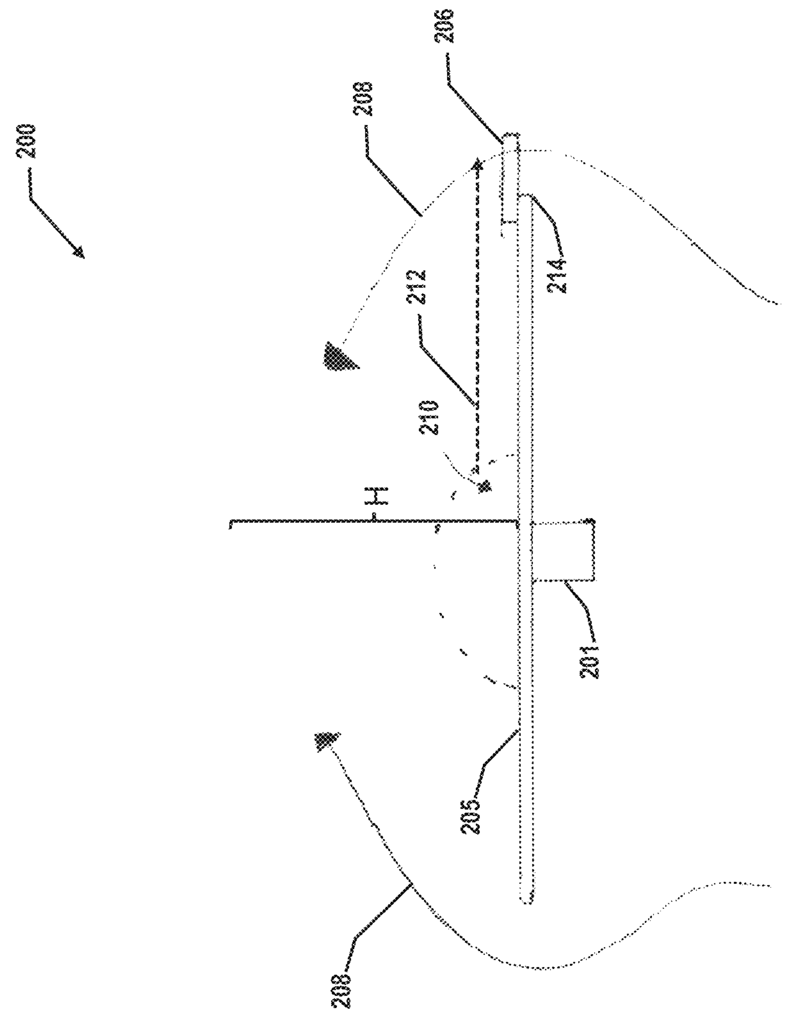
FIG. 2 is a block diagram profile view of a PCBA LED light assembly, in accordance with some embodiments.

FIG. 2 is a block diagram profile view of a PCBA LED light assembly 200, in accordance with some embodiments.

In FIG. 2, PCBA LED light assembly 200 incorporates heat pipe 206. In some embodiments PCBA LED light assembly 200 is like PCBA LED light assembly 100. While some embodiments are discussed in relation to a heat pipe, such as heat pipe 206, other cooling devices including evaporative cooling devices are contemplated without departing from the scope of the embodiments.

In FIG. 2, air flow 208 flows around substrate 205 and reconvenes at a height (H) above the substrate 205. Air flow 208 is created by natural convection. Air flow 208 flows around substrate 205 as air flow 208 is heated and has a lower density than other ambient air around PCBA LED light assembly 200. That is, as warmer air flow 208 flows upward, heavier cooler air is pulled by gravity in the opposite direction as air flow 208. As air flow 208 moves around substrate 205, little of air flow 208 reaches the backside center of substrate 205 and a zone 210 is created where the velocity of airflow 208 is low. Heat from LEDs 201 pools in zone 210 as air flow 208 is too distant from zone 210 to pull the heat away from zone 210.

The word convection has different but related usages in different scientific or engineering contexts or applications. The broader sense is in fluid mechanics, where convection refers to the motion of fluid driven by density (or other property) difference.

In thermodynamics, convection often refers to heat transfer by convection, where the prefixed variant natural convection is used to distinguish the fluid mechanics concept of convection from convective heat transfer.

Natural convection is a type of flow, of motion of a liquid such as water or a gas such as air, in which the fluid motion is not generated by any external source (like a pump, fan, suction device, or the like) but by some parts of the fluid being heavier than other parts. In most cases this leads to natural circulation, the ability of a fluid in a system to circulate continuously, with gravity and possible changes in heat energy. The driving force for natural convection is gravity. For example, if there is a layer of cold dense air on top of hotter less dense air, gravity pulls more strongly on the denser layer on top, so it falls while the hotter less dense air rises to take its place. This creates circulating flow or convection. Natural convection occurs when there are hot and cold regions of either air or water because both water and air become less dense as they are heated.

In some embodiments, heat pipe 206 acts as an evaporative cooling part. In FIG. 2, heat pipe 206 is coupled to metal on the backside of substrate 205. Heat pipe 206 is configured to wick heat away from zone 210 to a cooler zone such as airflow 208 along arrow 212. In some embodiments, heat pipe 206 extends from zone 210. In some embodiments, heat pipe 206 extends from zone 210 to an edge 214 of the substrate 205 or beyond edge 214. In some embodiments, heat pipe 206 extends beyond edge 214 of substrate 205 (as shown in FIG. 2) to enter a region of faster moving air velocity due to natural convection, such as air flow 208.

Figures 3A, 3B:
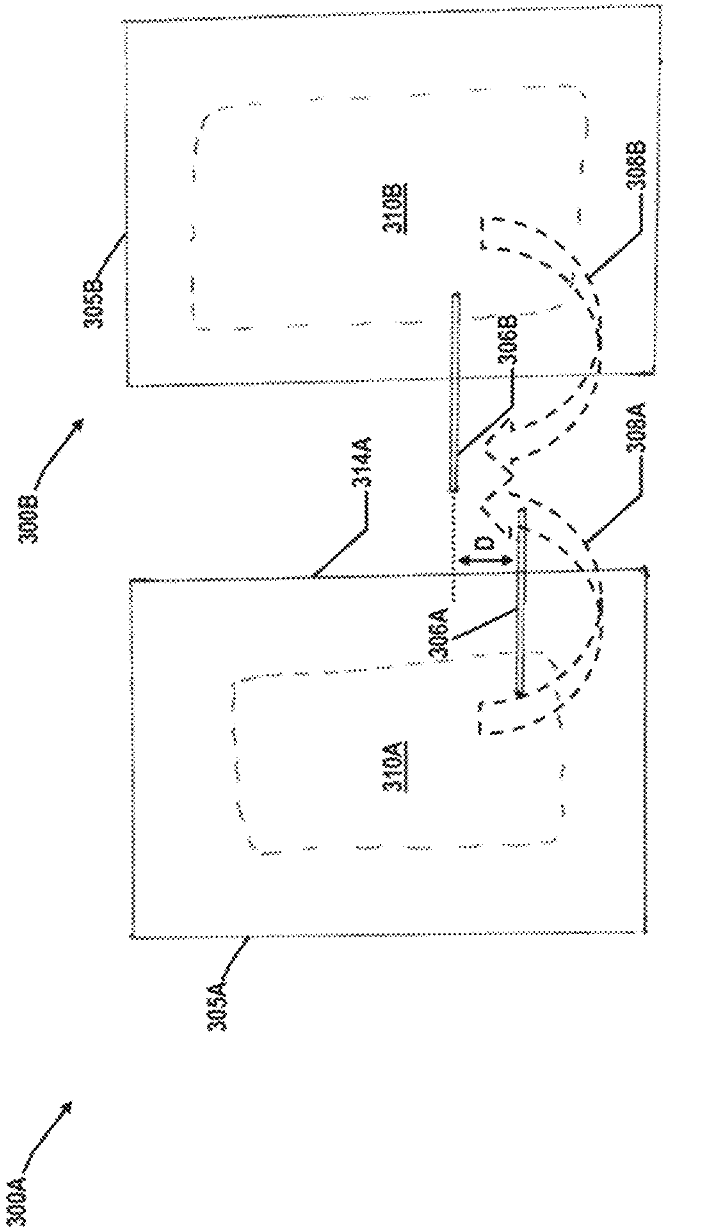
FIGS. 3A and 3B are block diagrams of top views of PCBA LED light assemblies, in accordance with some embodiments.

FIGS. 3A and 3B are block diagrams of top views of PCBA LED light assemblies 300A and 300B, in accordance with some embodiments. In some embodiments, PCBA LED light assemblies 300A and 300B are similar to PCBA LED light assemblies 200 or 100.

In FIG. 3A PCBA LED light assembly 300A includes a heat pipe 306A coupled to metal (not shown) on the backside of a substrate 305A and extending from zone 310A out past an edge 314A of substrate 305A, which is in direct airflow 308A past substrate 305A. In some embodiments, heat pipe 306A does not extend beyond the edge of substrate 305A.

In FIG. 3B, heat pipe 306B coupled to substrate 305B is offset, by lateral distance D, from heat pipe 306A. In some embodiments, the offset between PCBA LED light assembly 300A and 300B is offset horizontally, vertically, or a combination of both horizontally and vertically. PCBA LED light assembly 300A is adjacent to PCBA LED light assembly 300B and heat pipe 306A is offset horizontally from heat pipe 306B. In some embodiments, PCBA LED light assemblies 300A and 300B are placed close enough to create a chimney effect, which increases the velocity of air flow, such as the combination of air flows 308A and 308B, due to natural convection. This increased air velocity is more effective at removing heat from heat pipes 306A and 306B than if PCBA LED light assembly 300A or 300B were to be used independently of one another.

The chimney effect or stack effect is the movement of air into and out of buildings, chimneys, flue gas stacks, or other containers due to buoyancy. Buoyancy occurs due to a difference in indoor-to-outdoor air density resulting from temperature and moisture differences. The greater the thermal difference and the height of the structure, the greater the buoyancy force, and thus the stack effect. The stack effect helps drive natural ventilation and infiltration.

In FIGS. 3A and 3B, the air around offset heat pipes 306A and 306B is heated quicker and hotter than either of heat pipes 306A or 306B alone. The air between heat pipes 306A and 306B expands becoming less dense and moves upward while the cool air moves downward. Thus, a chimney is created between heat pipes 306A and 306B. The movement of air through the chimney acts to cool heat pipes 306A and 306B which helps to remove or wick heat away from substrates 305A and 305B.

Figure 4:
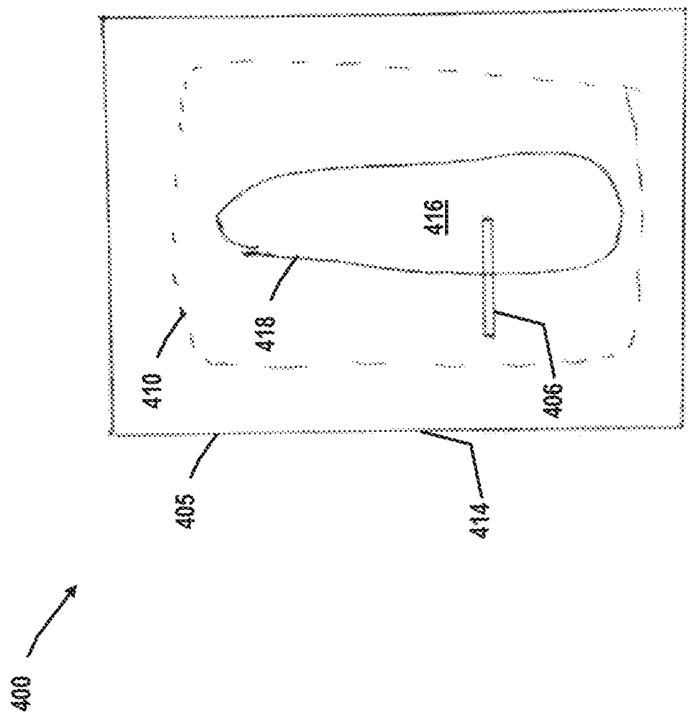
FIG. 4 is a block diagram top view of a PCBA LED light assembly, in accordance with some embodiments.

FIG. 4 is a block diagram top view of a PCBA LED light assembly 400, in accordance with some embodiments. In some embodiments, PCBA LED light assembly 400 is similar to PCBA LED light assemblies 300A, 300B, 200 or 100.

In FIG. 4, PCBA LED light assembly 400 includes a center hole 416 cut out of substrate 405 to allow airflow to pass through substrate 405 instead of around the outer edge 414 of substrate 405. Heat pipe 406 extends from substrate 405 beyond an inner edge 418 where substrate 405 meets hole 416. Heat pipe 406 directs or wicks heat away from zone 410 and into hole 416 where there is higher air velocity due to natural convection.

Figure 5:
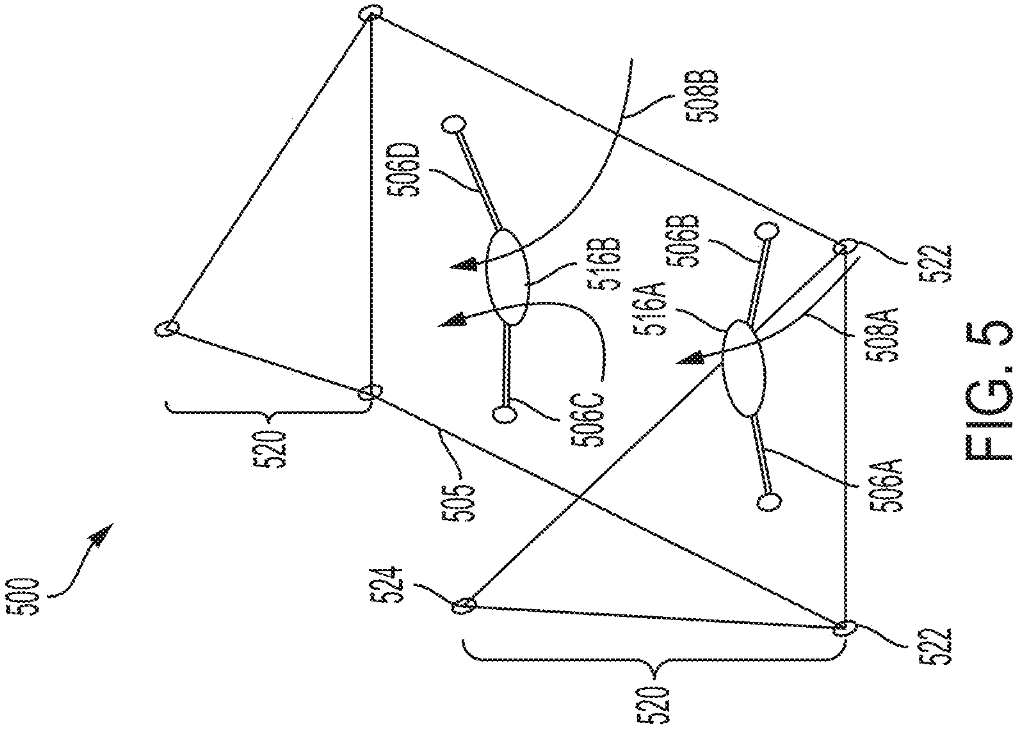
FIG. 5 is a block diagram elevated perspective view of a PCBA LED light assembly, in accordance with some embodiments.

FIG. 5 is a block diagram elevated perspective view of a PCBA LED light assembly 500, in accordance with some embodiments In some embodiments, PCBA LED light assembly 500 is similar to PCBA LED light assemblies 400, 300A, 300B, 200 or 100.

Figure 11:
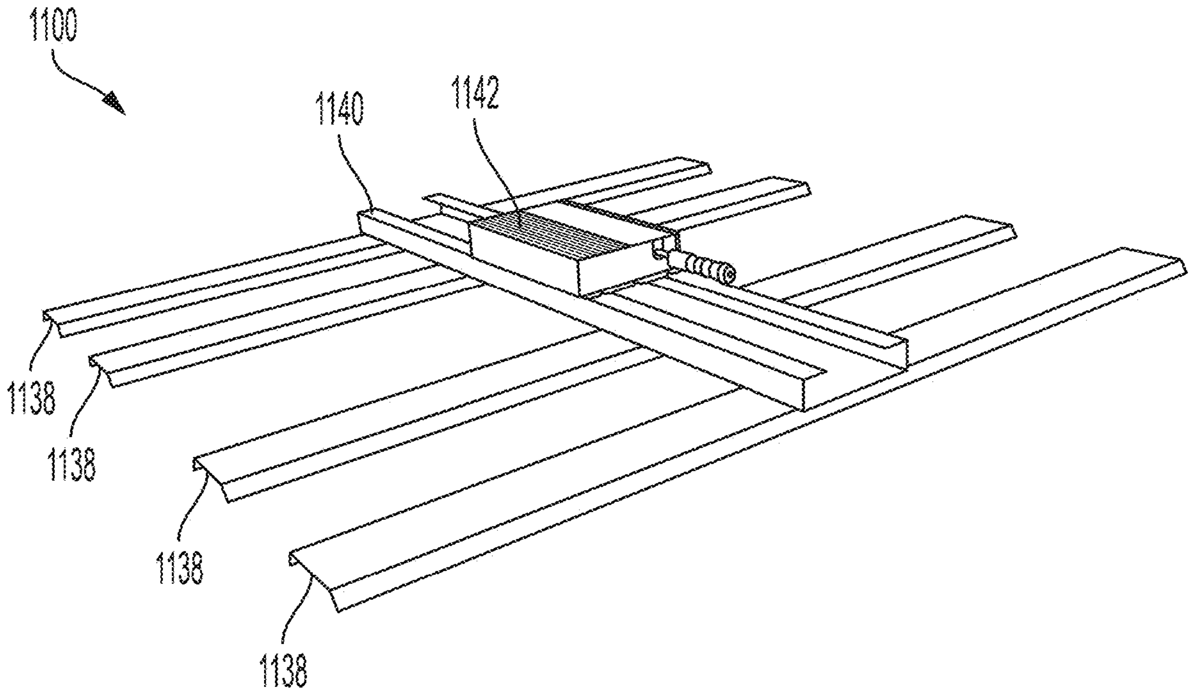
FIG. 11 is a perspective view of a PCBA LED light array, in accordance with some embodiments.

In FIG. 5, PCBA LED light assembly 500 is a light assembly housing all or most of the LEDs in a light assembly. In some embodiments, PCBA LED light assembly 500 is a light bar or other sub section of a light array or light assembly (FIG. 11). An LED light bar is a type of electrical light fixture. A light bar is characterized as being elongated and having several bulbs or LEDs. LED light bars are able to be attached to one other.

PCBA LED light assembly 500 incorporates additional heat pipes 506A, 506B, 506C, and 506D and additional holes 516A and 516B. Additionally, PCBA LED light assembly 500 includes mechanical hanging brackets 520. Mechanical hanging brackets 520 are located at opposite ends of PCBA LED light assembly 500 and include two connections 522 at substrate 505 and one upper connection 524 which is capable of being coupled to a ceiling or a coupling hanging from a ceiling. Multiple holes 516A and 516B allow for multiple airflow patterns 508A and 508B to remove heat from PCBA LED light assembly 500.

Figure 6:
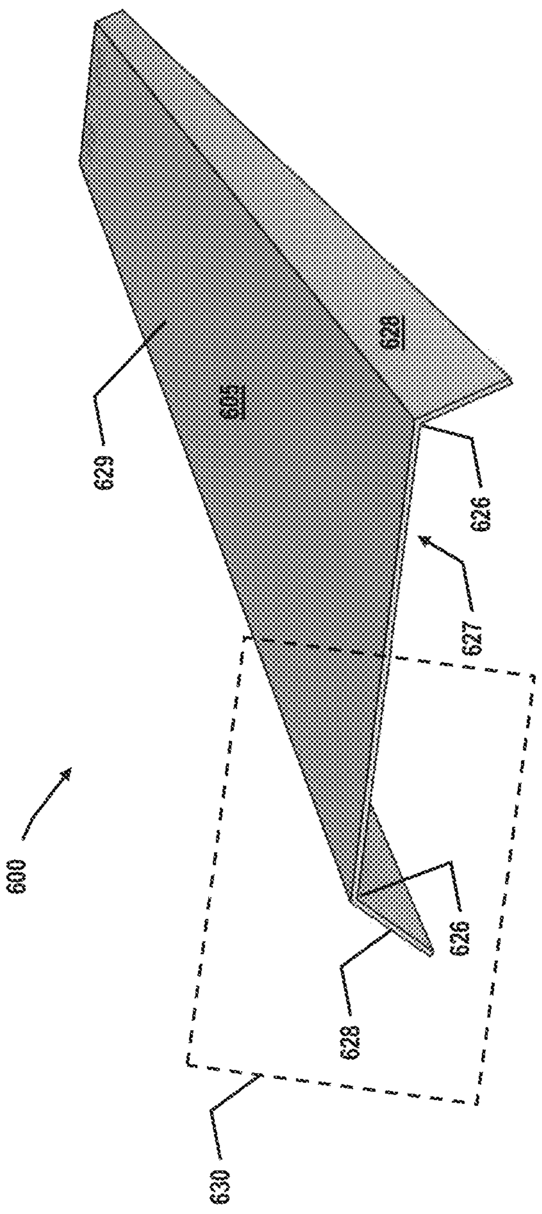
FIG. 6 is an end perspective view of a PCBA LED light assembly, in accordance with some embodiments.

FIG. 6 is an end perspective view of a PCBA LED light assembly 600, in accordance with some embodiments. In some embodiments, PCBA LED light assembly 600 is similar to PCBA LED light assemblies 500, 400, 300A, 300B, 200 or 100.

PCBA LED light assembly 600 is a light bar, of which multiple light bars are able to be attached together to form a lighting array 1100 (FIG. 11). PCBA LED light assembly 600 has bends 626 in the PCBA substrate 605. In some embodiments, a bending brake is used to implement bends 626. In some embodiments, substrate 605 has a thickness ranging from 0.8-2.0 mm. In an embodiment using a 1.4 mm thick 5052 aluminum substrate, a die used for implementing the bends is a V6 die as opposed to a V10 die. The V6 die is a V-shaped groove having an opening of 6 mm. A corresponding mating punch is used with the V6 die to bend the PCB. In other approaches, a V10 die would normally be used but it has been found that this causes blowout of the holes of the substrate during bending. The V6 die has been found to have improved performance in bending and achieving better results with less chance of blowout around the holes of the substrate. PCBA LED light assembly 600 includes a component side 627 and a non-populated side 629.

In at least one embodiment, the process of manufacturing the PCBA LED light assembly 600 includes completing the substrate (PCB) of the assembly using known processes, including routing elongated and/or centerline holes for venting, before the PCB is populated with LED components. The PCBA LED light assembly 600 is assembled with LED components before being bent and after being routed using robotic assembly processes. Assembling the LED components prior to bending the PCB eliminates the possibility of a robotic arm coming into contact with the bent portion of the PCB. After completing LED placement, the PCB is placed into a sheet metal break with the bend line at 4 mm from the elongated holes. In at least some embodiments, the bend line ranges from 2-10 mm from the elongated holes. The sheet metal break bends the PCB from 10 to 90 degrees from the original PCB plane toward or away from the component side of the PCB. In some embodiments, the PCB is bent such that the distal portion of the PCB is bent at 30 degrees inward (60 degrees off of perpendicular) toward to component side of the PCB.

On component side 627 of PCBA LED light assembly 600, LEDs, resistors, fuses, jumpers, and one or more connectors (not shown) are placed on an underside of PCBA LED light assembly 600. As discussed above, one or more connectors are placed in such a way that the leads of each connector are soldered to the PCB and the main connector housing passes through the PCB through a wire or other conductive connector. Component side 627 corresponds to the layer including LEDs 101 in FIG. 1. On non-populated side 629 of PCBA LED light assembly 600, wires are inserted into the one or more connectors. Non-populated side 629 corresponds to substrate layer 105 in FIG. 1 In some embodiments, the return (or ground) tracings for the LEDs are placed toward the outside of PCBA LED light assembly 600 and the positive electrical tracings are placed near the centerline of PCBA LED light assembly 600. In these instances, the return path is closest to bends 626. In some embodiments, bends 626 are formed where copper from PCBA LED light assembly 600 has been etched away. In some embodiments, the copper is thatched or formed in a diamond like pattern of non-connected geometrical shapes to prevent a short from the copper to the metal backing of substrate 605.

In some embodiments, PCBA LED light assembly 600 is coated with a high emissivity (effectiveness in emitting energy as thermal radiation) coating (not shown) on wings 628 of PCBA LED light assembly 600 (post bend) and/or non-populated side 629 of PCBA LED light assembly 600. Box 630 is discussed with reference to FIG. 7 below.

Including bend 626 along the length of assembly 600 improves the structural rigidity of assembly 600 and reduces the amount of bending of the assembly that occurs over a given length of the assembly. That is, the assembly 600 is able to extend a longer distance from a given supported portion of the assembly due to the presence of the wings 628 resulting from the bends 626.

In at least one embodiment, a center portion of the assembly 600 is supported from below or hung from above and the longitudinal ends of the assembly are cantilevered by the opposite end of the assembly extending in the opposite direction from the center portion. In at least one embodiment, the opposite ends of the longitudinally extending assembly 600 are supported and the middle of the assembly is supported through the wings 628 and bends 626. Through the use of wings 628 and bends 626, a ratio of the length of the assembly 600 to the height of the wing 628 ranges from 1:1 to 1:30. That is, for a 1 inch high wing 628, the assembly length can extend 30 inches in length without substantial deflection downward.

Figure 7:
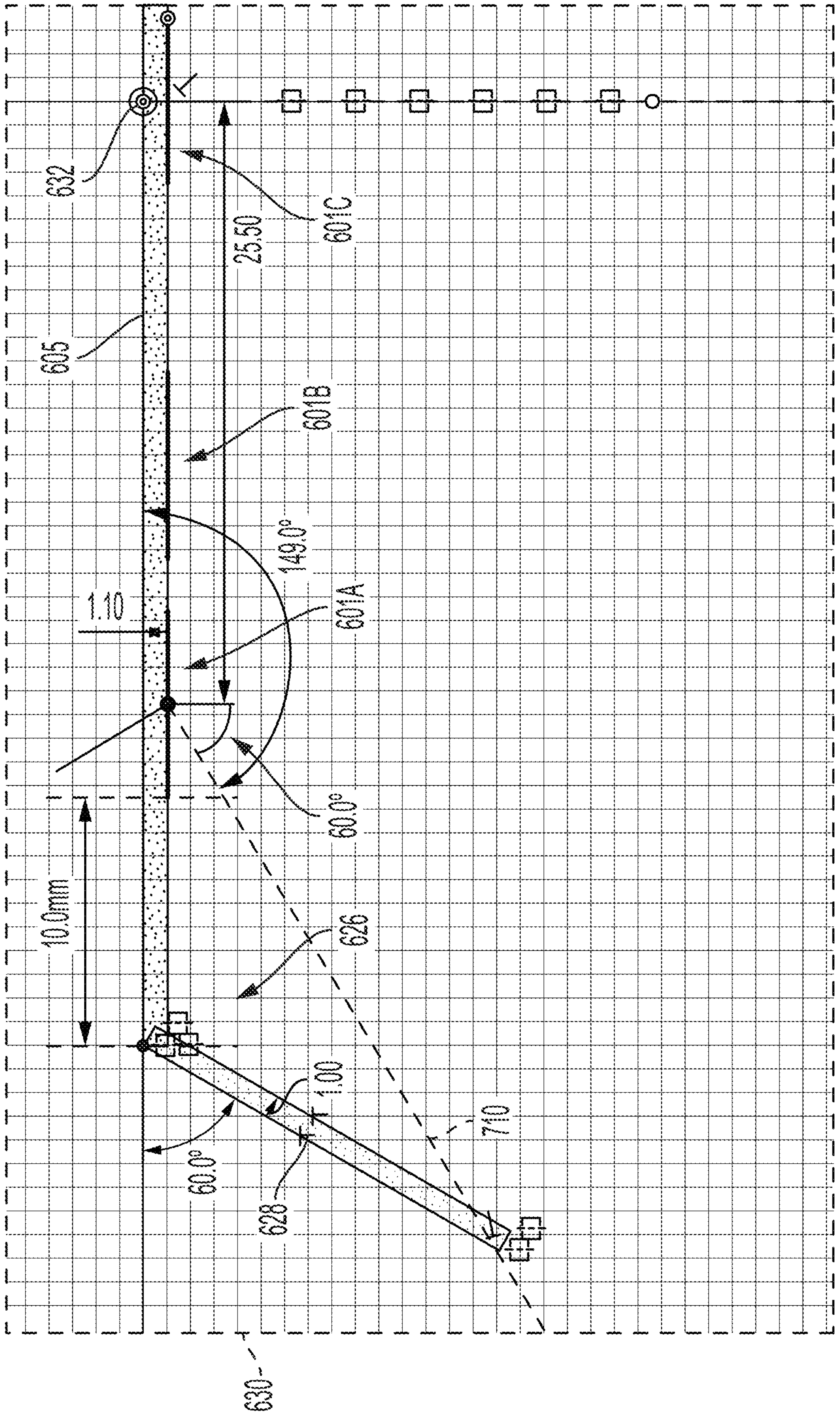
FIG. 7 is an end cross section view of a portion of a bend in a PCBA LED light assembly, in accordance with some embodiments.

FIG. 7 is an end cross section view of a portion of a bend in a PCBA LED light assembly 600, in accordance with some embodiments.

In some embodiments, bend 626 of PCBA LED light assembly 600 is located between 1 mm and 50 mm from outermost electrical tracing 632 of PCBA LED light assembly 600. Thus, bend 626 does not affect any electrical tracings and also does not potentially cause any electrical complications, such as shorts and open circuits.

In some embodiments, bent portion or wing 628 does not significantly obstruct emitted light coming LEDs 601A, 601B, or 601C on PCBA LED light assembly 600. In some embodiments, the light enters a viewing angle of the LEDs by more than 10 mm. Broken line 710 is the extent of one half of the viewing angle of the LED, i.e., 60°. In some embodiments, the viewing angle is 120° (180° minus 60° from substrate 605 to bent portion 628), of which light is emitted up to 60° from the center and the resulting angle from horizontal is 149°. In some embodiments, the practical viewing angle for bending is up to 10° more or 10° less than the specified viewing angle of the LEDs. In some embodiments, the angle of the metal bend is no more than 90° from the substrate plane and no less than 10° from the plane of substrate 605. In some embodiments, the bent portion of the PCB distal from the one or more groups of LEDs has a width ranging from 1-50 mm. That is, the width of the bent "wing" portion of the PCB has a width ranging from 1-50 mm.

Figure 8:
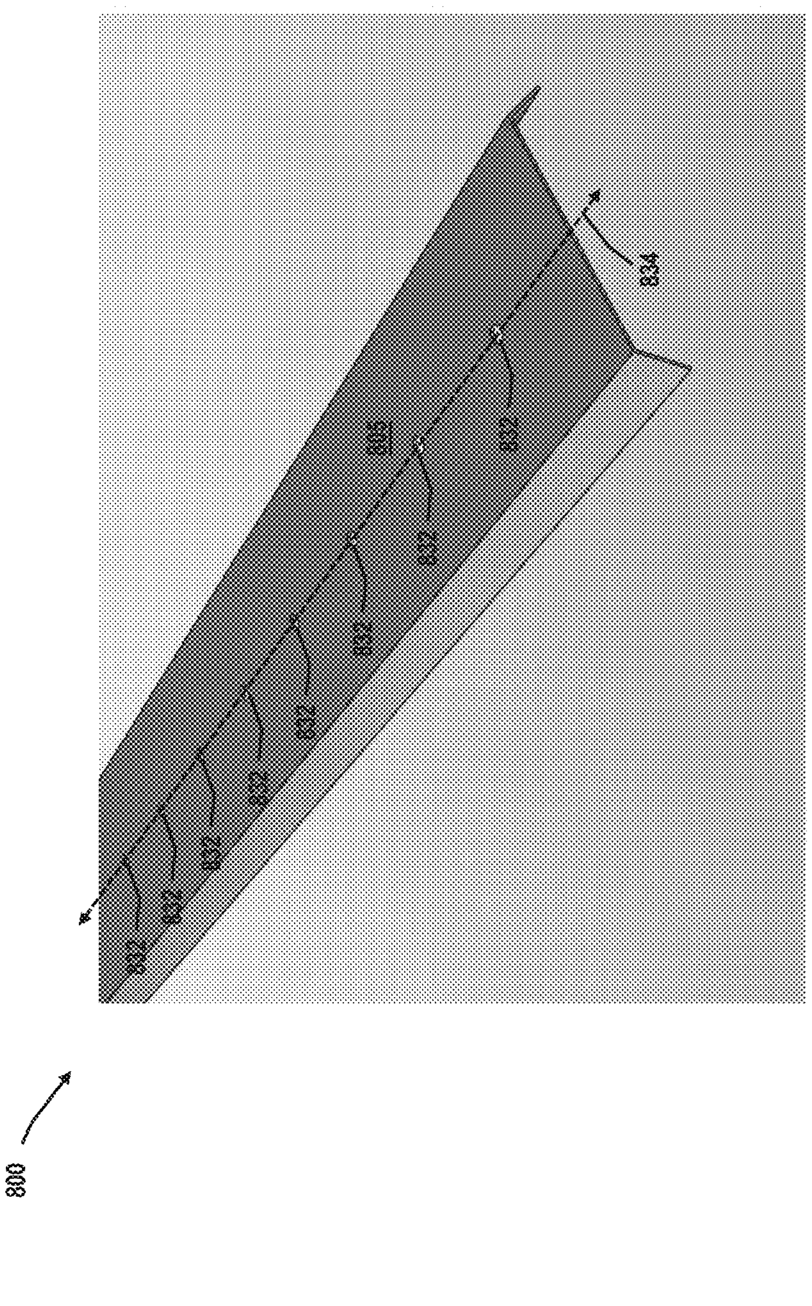
FIG. 8 is another perspective view of a portion of a PCBA LED light assembly, in accordance with some embodiments.

FIG. 8 is another perspective view of a portion of a PCBA LED light assembly 800, in accordance with some embodiments. In some embodiments, PCBA LED light assembly 800 is similar to PCBA LED light assemblies 600, 500, 400, 300A, 300B, 200 or 100.

PCBA LED light assembly 800 includes holes 832 on or near longitudinal centerline 834 of substrate 805. Holes 832 are used to increase the effects of natural convection by allowing air to flow through from a component side to a non-populated side. Holes 832 are circular, however, holes 832 are rectangular (with straight or curved corners), or elliptical, in some embodiments.

Figure 9:
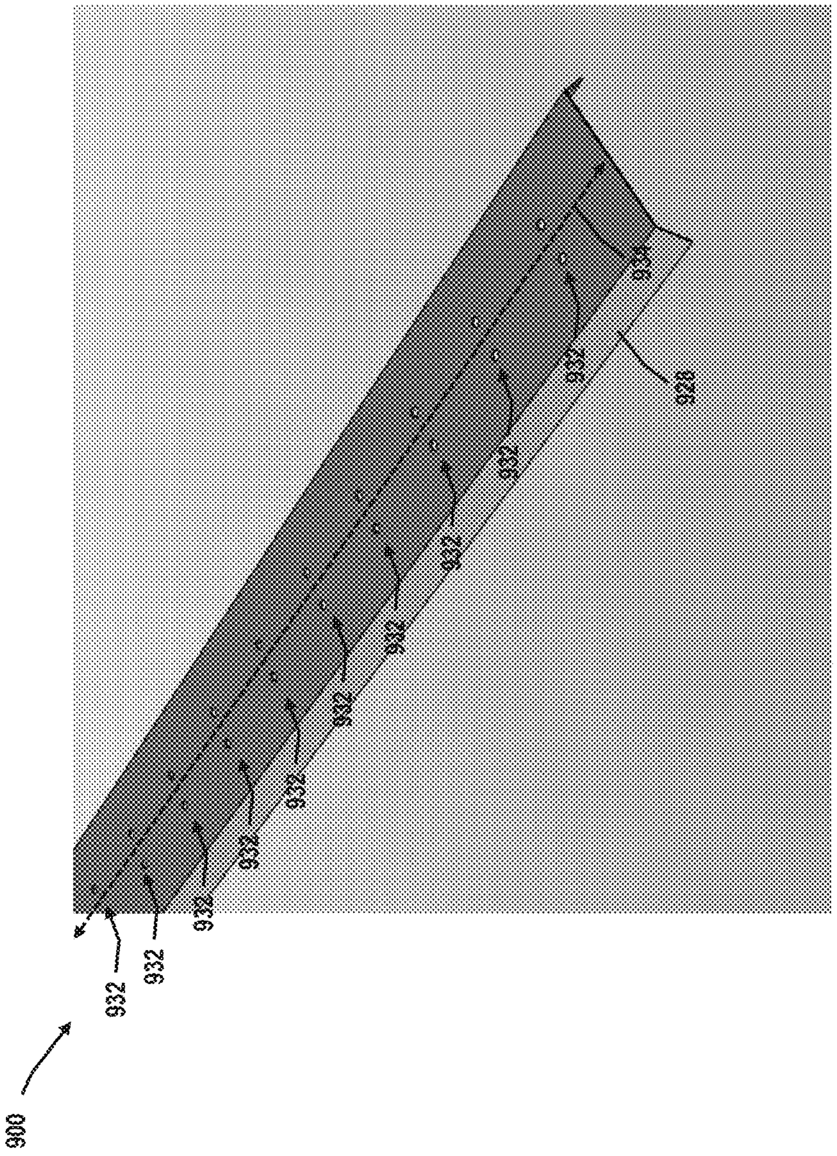
FIG. 9 is another perspective view of a portion of a PCBA LED light assembly, in accordance with some embodiments.

FIG. 9 is another perspective view of a portion of a PCBA LED light assembly 900, in accordance with some embodiments. In some embodiments, PCBA LED light assembly 900 is similar to PCBA LED light assemblies 800, 600, 500, 400, 300A, 300B, 200 or 100.

Contrasted with PCBA LED light assembly 800, PCBA LED light assembly 900 includes additional holes 932 arranged on either side of centerline 934. These additional holes 932 increase natural convection due to airflow through holes 932 and around wings 928.

Figure 10A:
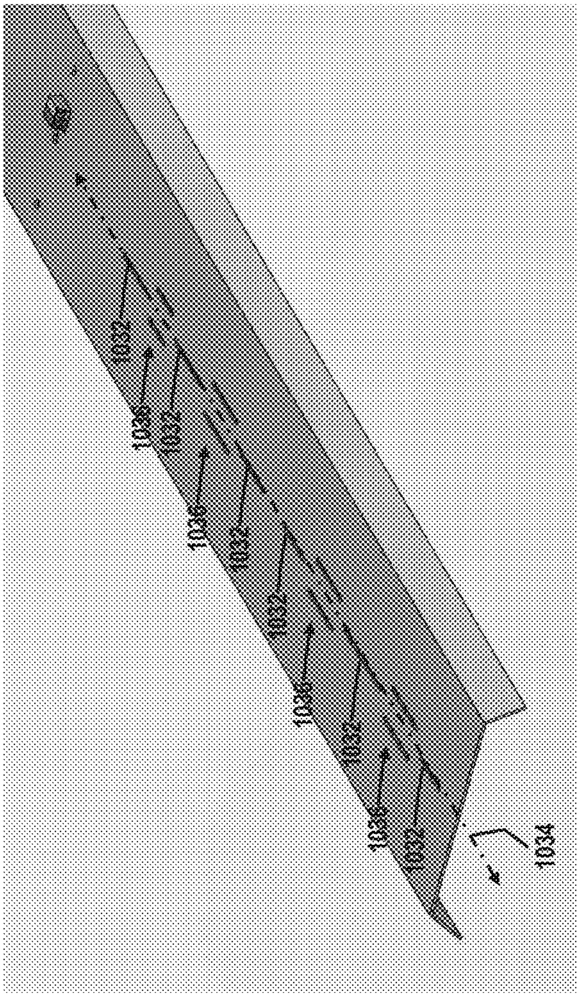
FIG. 10A is another perspective view of a portion of a PCBA LED light assembly, in accordance with some embodiments.

FIG. 10A is another perspective view of a portion of a PCBA LED light assembly 1000, in accordance with some embodiments. In some embodiments, PCBA LED light assembly 1000 is similar to PCBA LED light assemblies 900, 800, 600, 500, 400, 300A, 300B, 200 or 100.

Centerline holes 1032, similar to PCBA LED light assembly 800, are used in conjunction with holes 1036 that are offset from the centerline 1034, similar to PCBA LED light assembly 900. Further, holes 1032 and 1036 are elongated providing more hole surface area for natural convection air flow. Further, the staggered alignment of holes 1032 and 1036 assists PCBA LED light assembly 1000 retain structural integrity and prevent the substrate from bending inward or separating (e.g., similar to a perforated edge used to allow easy separation of two sections of the material). In at least one embodiment, a distance between the bend and at least one of the one or more groups of LEDs ranges from 1-10 mm. In at least one embodiment, a distance across the PCB between the parallel bend lines ranges from 10-300 mm. In at least another embodiment, the distance between parallel bend lines ranges from 30-200 mm.

Figure 10B:
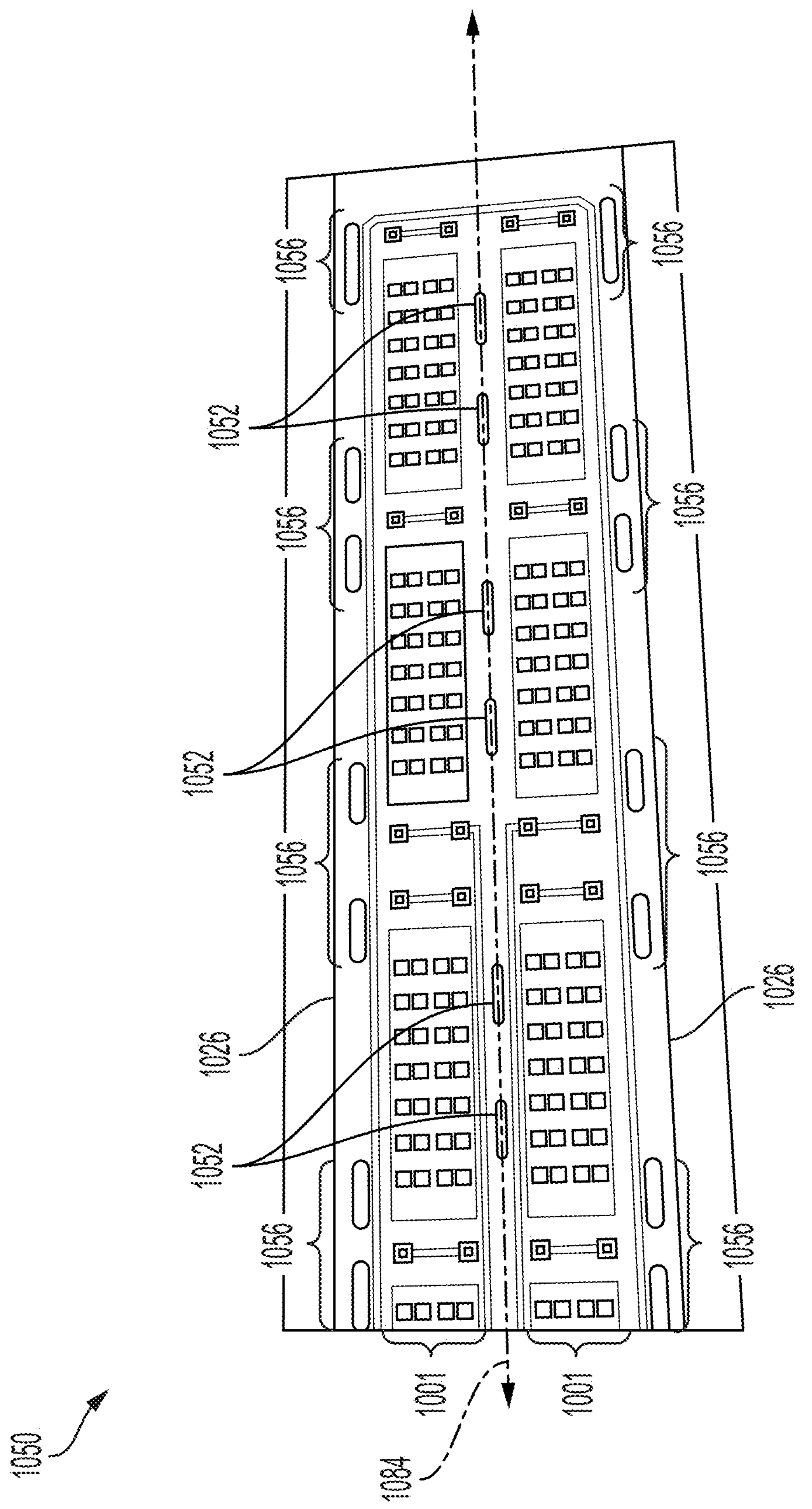
FIG. 10B is another perspective view of a portion of a PCBA LED light assembly, in accordance with some embodiments.

FIG. 10B is another perspective view of a portion of a PCBA LED light assembly 1050, in accordance with some embodiments. In some embodiments, PCBA LED light assembly 1050 is similar to PCBA LED light assemblies 1000, 900, 800, 600, 500, 400, 300A, 300B, 200 or 100.

Centerline holes 1052, similar to PCBA LED light assembly 1000 and 800, are used in conjunction with holes 1056 that are between bend 1026 and LEDs 1001 are offset from the centerline 1084. In at least one embodiment, the offset holes 1056 are aligned ranging from 1-10 mm from the bend 1026 toward LEDs 1001.

FIG. 11 is a perspective view of a PCBA LED light array 1100, in accordance with some embodiments.

PCBA LED light array 1100 includes one or more PCBA LED light assemblies 1138. In some embodiments, PCBA LED light assemblies 1138 are similar to PCBA LED light assemblies 1000, 900, 800, 600, 500, 400, 300A, 300B, 200 or 100.

PCBA LED light assemblies 1138 are coupled to a structural component 1140 (e.g., coupled to the bottom of structural unit 1140 with screws, rivets, or other coupling mechanisms or the like). In some embodiments, in contrast to each PCBA LED light assembly 1138 being suspended or hung from a support, structural component 1140 is suspended or hung from a support with hanging brackets, such as hanging brackets 520. A power supply unit 1142 is coupled to structural component 1140 and electrically coupled to PCBA LED light assemblies 1138, e.g., via cabling.

Figure 12:
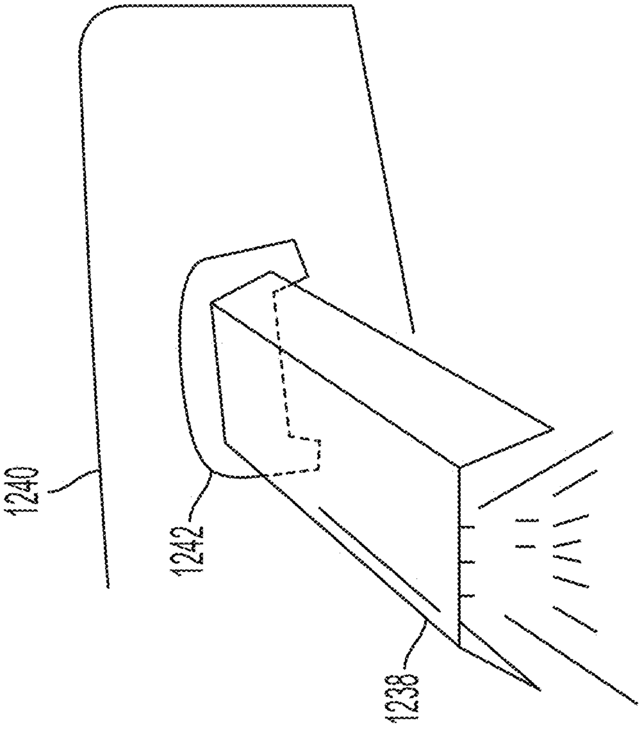
FIG. 12 is a perspective view of a slot connector for a PCBA LED light array, in accordance with some embodiments.

FIG. 12 is a perspective view of a slot connector for a PCBA LED light array, in accordance with some embodiments.

In FIG. 12, PCBA LED light assembly 1238 is coupled to structural component 1240 though a slot 1242 on the side structural component 1240. Slot 1242 has a winged shape similar to the shape of PCBA LED light assembly 1238 where PCBA LED light assembly 1238 is able to be slid into slot 1242, extending through an opposite side of structural component 1240 and be held in place by the weight of PCBA LED light assembly 1238. In some embodiments, PCBA LED light assembly 1238 clicks directly into the center of slot 1242 and structural component 1240 provides support for PCBA LED light assembly 1238 to prevent gravitational warping. In some embodiments, PCBA LED light assembly 1238 connects directly to a power supply through traces on PCBA LED light assembly 1238 contacting power traces located on slot 1242. In a non-limiting example, PCBA LED light assembly 1238 acts directly as a power connection where a portion of a positive and return connection are without solder mask and able to be connected directly to a power source.

Figure 13:
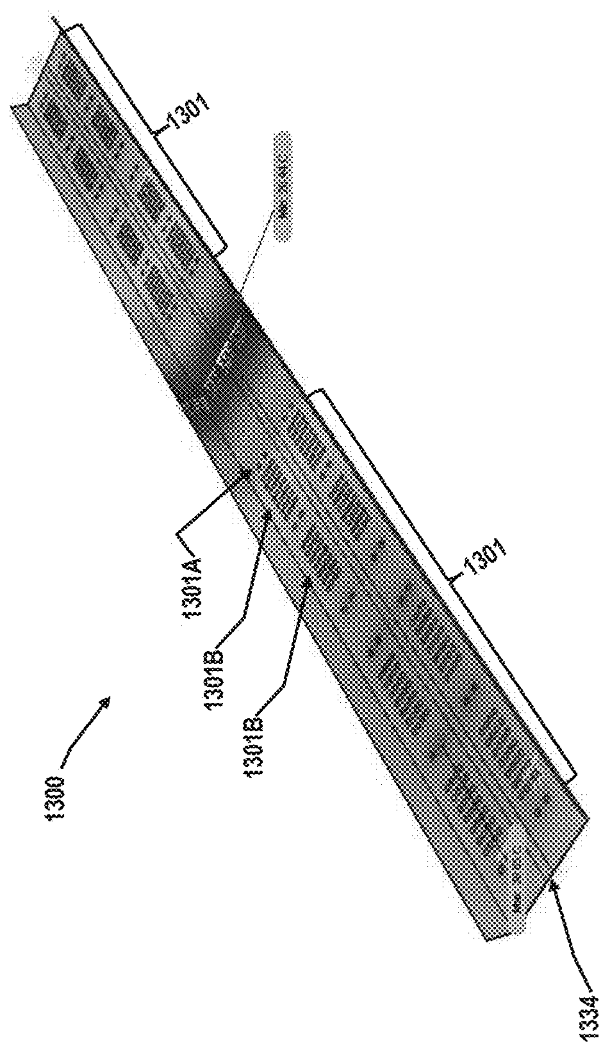
FIG. 13 is a perspective view of a thermal imaged simulation of a PCBA LED light assembly, in accordance with some embodiments.

FIG. 13 is a perspective view of a thermal imaged PCBA LED light assembly 1300, in accordance with some embodiments.

Figure 14A:
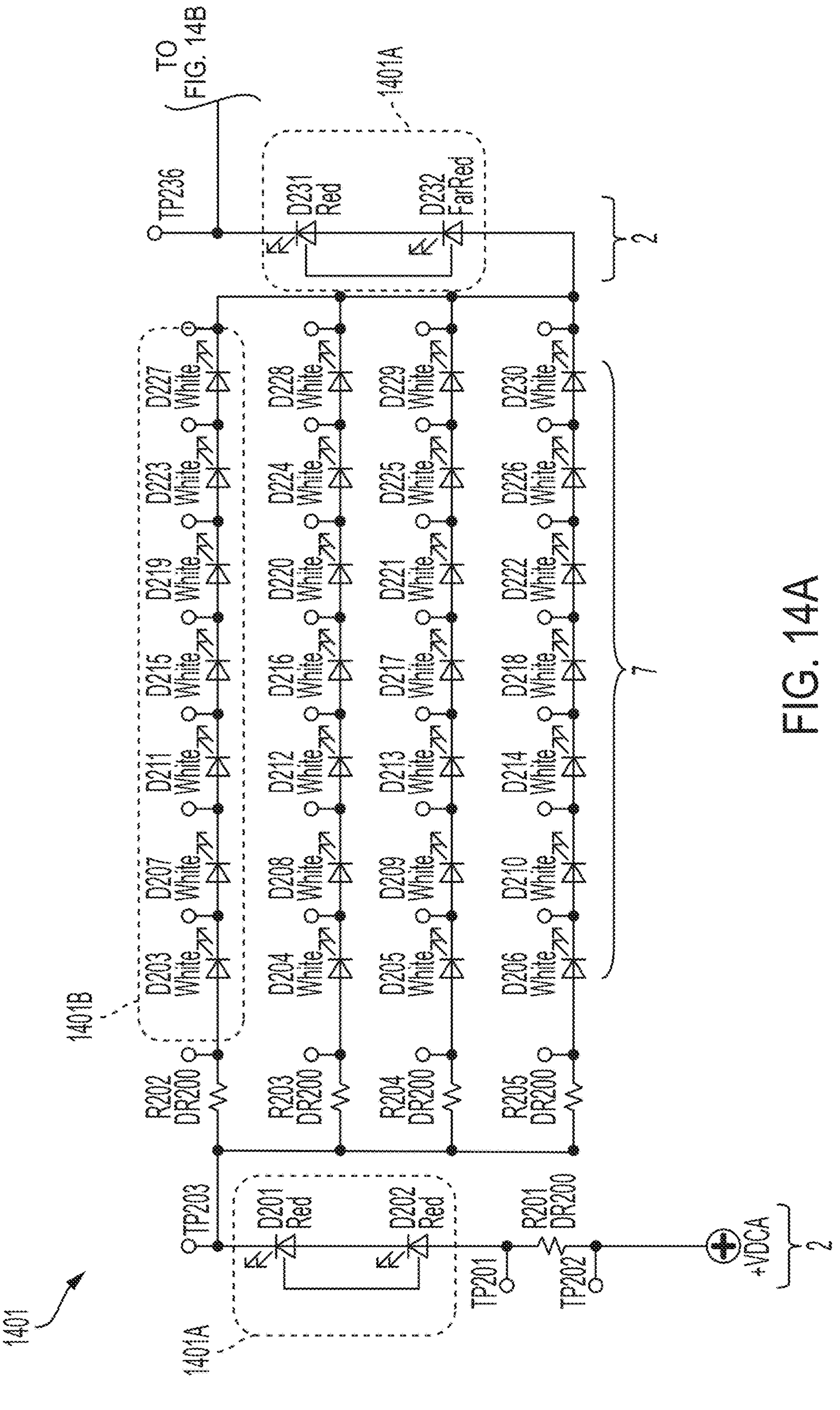
FIGS. 14A and 14B are schematic diagrams of an electrical connection of LEDs, in accordance with some embodiments.
Figure 14B:
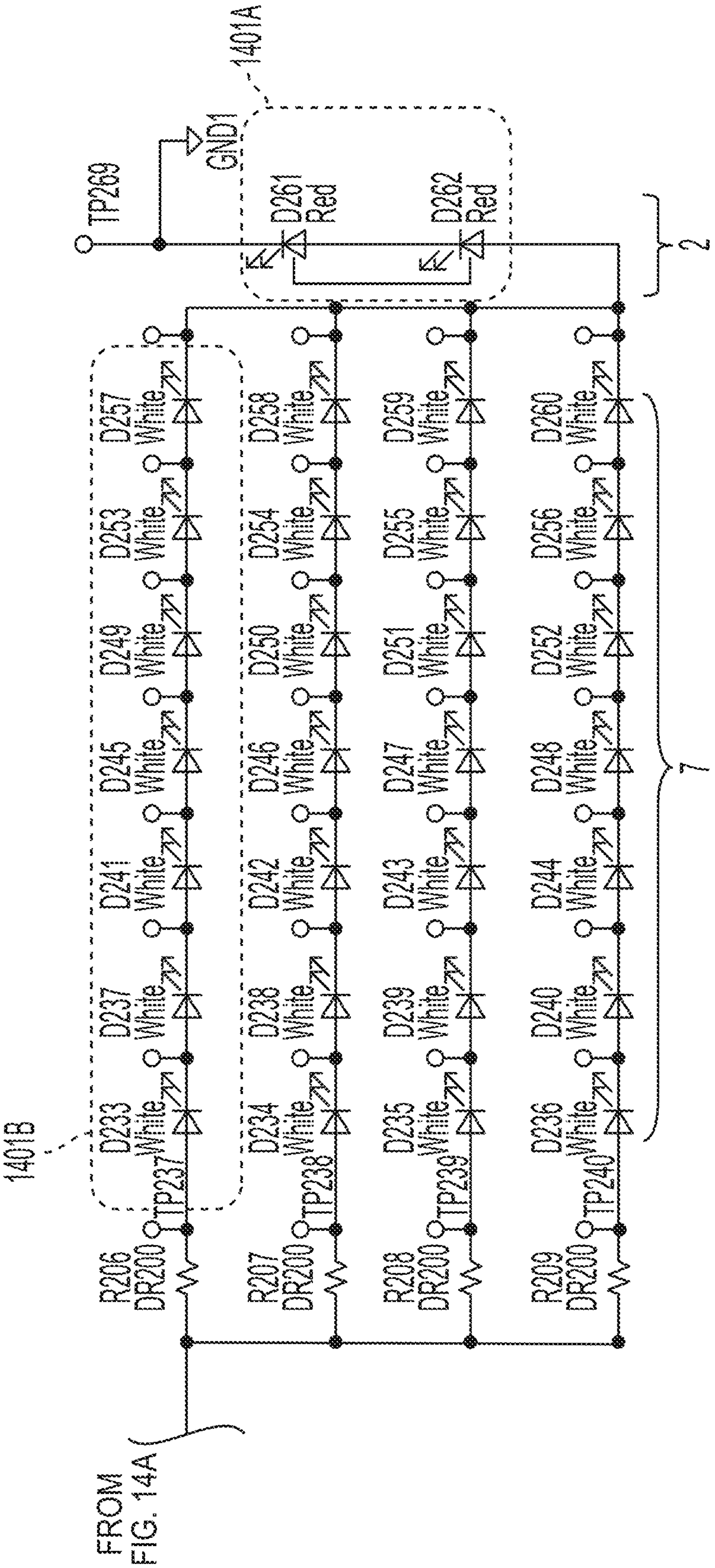

FIGS. 14A and 14B are schematic diagrams of an electrical connection of LEDs 1401, in accordance with some embodiments. FIGS. 13 and 14 are discussed together in relation to geometric placement of LEDs to prevent thermal runaway.

In FIG. 13, the distance between LEDs 1301 in PCBA LED light assembly 1300 is non-linear to limit heat pooling. Further, the heat dissipation across PCBA LED light assembly 1300, with non-linear spacing, shows a balanced temperature spread from the middle of PCBA LED light assembly 1300 to adjacent the ends of PCBA LED light assembly 1300.

In other approaches, LEDs are spaced equidistant from one another. As discussed above, heat pools toward the center of LED light assemblies. If a traditional heat sink back plate is not used, heat pooling becomes a concern because of the nature of LED diodes. As LED diodes experience more heat, the LEDs consume more current and therefore incur thermal runaway.

Thermal runaway describes a process that is accelerated by increased temperature, in turn releasing energy that further increases temperature. Thermal runaway occurs in situations where an increase in temperature changes the conditions in a way that causes a further increase in temperature, often leading to uncontrolled positive feedback.

In FIG. 13, high heat generating LEDs 1301A, such as monochromatic wavelength LEDs that emit red, far red, green, or blue light, are moved closer to zones of lower heat and/or lower heat generating components, such as white LEDs 1301B are moved farther away from the high heat LEDs 1301A. White LEDs 1301B produce less heat than red LEDs, especially on horticultural-focused products. In some embodiments, white LEDs 1301B are placed between 5 mm and 15 mm away from other groupings of white LEDs 1301B along centerline 1334.

LEDs 1401 are configured in a pattern whereby there are independent strings of LEDs which assist in reducing chances of thermal runaway. In a non-limiting example, there are sections of LEDs, such as LEDs 1301A (FIG. 13), that have monochromatic wavelengths and other sections of full spectrum wavelength LEDs such as LEDs 1301B (FIG. 13). Continuing with the non-limiting example, the sections of monochromatic wavelengths have LEDs that emit in the red, far red, green, or blue spectrum. In FIGS. 14A and 14B, the configuration of diode locations may correspond to a 2-7-2-7-2 pattern in which the section with 2 diodes 1401A indicates monochromatic wavelengths (e.g., higher heat producing) and the section of 7 diodes 1401B in series indicates white LEDs (e.g., lower heat producing). In some embodiments, the section of white LEDs in series range from 6 to 10 diodes long and are in parallel with 1 to 3 additional strings of the same number of white LEDs in a string.

In FIGS. 14A and 14B, the section of white diodes shows a 7 LED long series that has 3 additional strings in parallel. In some embodiments, the white LED strings are combined before running in parallel with the section of monochromatic color LEDs. Other potential configurations may be 2-7-1-8-2, 2-8-8-2, 1-8-2-8-1, 8-4-8, and other configurations that have symmetric placement of monochromatic LEDs within the section scheme.

Figure 15:
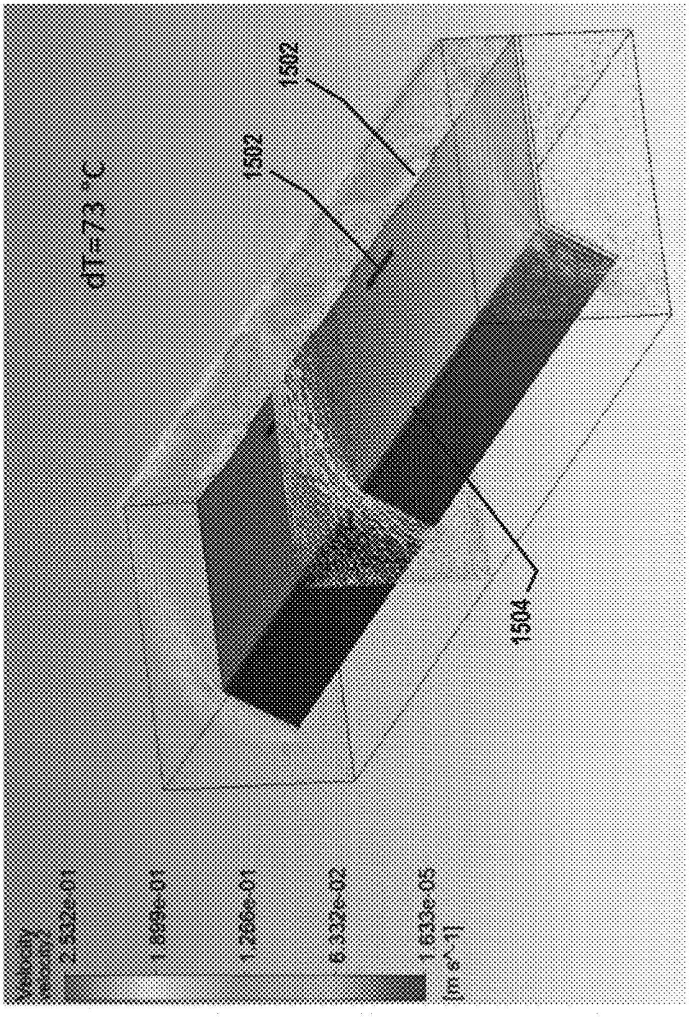
FIG. 15 is a perspective view of a thermal imaged simulation of a PCBA LED light assembly, in accordance with some embodiments.

FIG. 15 is a perspective view of a thermal imaged simulation of a portion of a PCBA LED light assembly, in accordance with some embodiments.

In FIG. 15, one quarter of a PCB LED light assembly 1500 is thermally imaged in accordance with a simulation to show substrate temperatures using a natural convection model. Centerline holes 1502 extend longitudinally along the centerline of the assembly 1500. Centerline holes 1502 are substantially equidistant from bends 1504 (only one side shown). As depicted one set of centerline holes 1502 are along the centerline of the assembly 1500 and another set are slightly offset from the centerline, e.g., within a range of 0-10 mm offset. In at least one embodiment, the length of the centerline holes ranges from 2-75 mm. In at least one embodiment, the length is greater than 75 mm. In at least one embodiment, a width of the centerline holes ranges from 1-30 mm. In at least one embodiment, a distance between adjacent centerline holes ranges from 1-50 mm. In FIG. 15, the maximum temperature difference ΔTmax along the simulated assembly 1500 is 73° C. Such a large ΔTmax indicates poor conduction performance of the configuration and will impact the lifetime of the diodes significantly based on the impact of the increased temperature.

Figure 16:
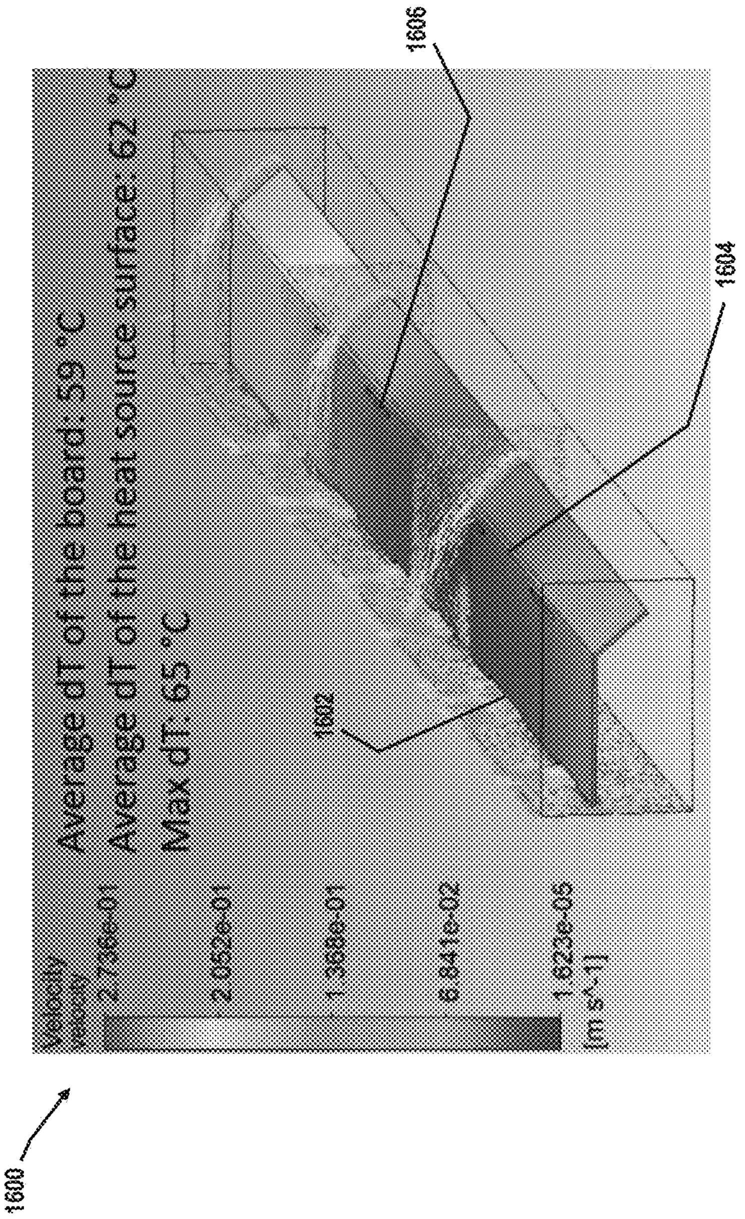
FIG. 16 is another perspective view of a thermal imaged simulation of a PCBA LED light assembly, in accordance with some embodiments.

FIG. 16 is another perspective view of a thermal imaged simulation of a portion of a PCBA LED light assembly, in accordance with some embodiments.

In FIG. 16, one quarter of a PCB LED light assembly 1600 is thermally imaged in accordance with a simulation to show substrate temperatures using a natural convection model. Centerline holes 1602 extend longitudinally along the centerline of the assembly 1600. Centerline holes 1602 are substantially equidistant from bends 1604 (only one side shown). In FIG. 16, a set of elongated holes 1606 (in some embodiments comprising the slightly offset centerline holes of FIG. 15) are included parallel to bend 1604. By including elongated holes 1606 near bend 1604, air is able to flow along either side of the bent portion. In FIG. 16, the maximum temperature difference ΔTmax along the simulated assembly 1600 is 65° C. Such a large ΔTmax indicates poor conduction performance of the configuration and will impact the lifetime of the diodes significantly based on the impact of the increased temperature. Including the elongated holes 1606 decreased the ΔTmax by 8° C.

The average temperature difference of the assembly 1600 is 59° C. and the average temperature difference of the heat source surface of assembly 1600 is 62° C.

Figure 17:
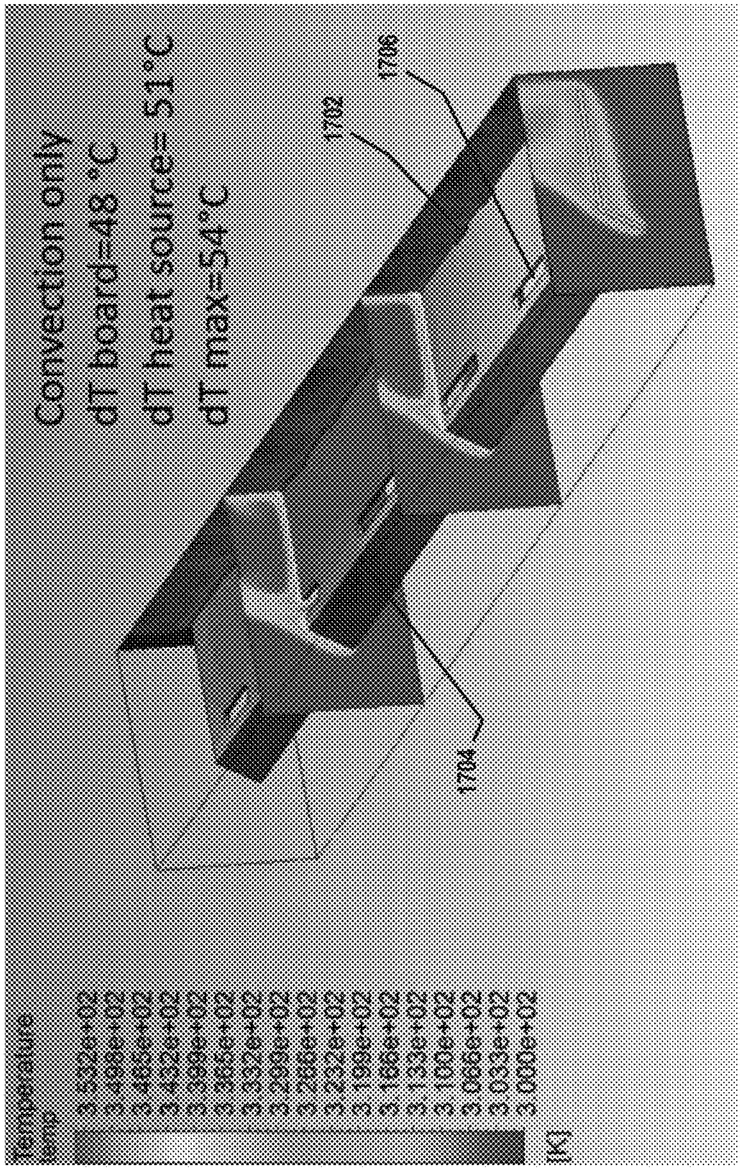
FIG. 17 is another perspective view of a thermal imaged simulation of a PCBA LED light assembly, in accordance with some embodiments.

FIG. 17 is another perspective view of a thermal imaged simulation of a portion of a PCBA LED light assembly, in accordance with some embodiments.

In FIG. 17, one quarter of a PCB LED light assembly 1700 is thermally imaged in accordance with a simulation to show substrate temperatures using a natural convection model. Centerline holes 1702 extend longitudinally along the centerline of the assembly 1700. Centerline holes 1702 are substantially equidistant from bends 1704 (only one side shown). In FIG. 17, a set of elongated holes 1706 are included parallel to bend 1704. The elongated holes 1706 have a larger diameter/width in comparison with the elongated holes 1606. The elongated holes 1706 have a width of 5 mm. In at least some embodiments, the elongated holes 1706 have a width ranging from 3-10 mm. In at least some other embodiments, the elongated holes 1706 have a width ranging from 1-30 mm. A smaller hole width than 1 mm is less effective for airflow. A larger hole width than 30 mm uses more valuable substrate are which can be used for additional components and/or for conduction and radiation of thermal energy.

In at least one embodiment, the length of the elongated holes ranges from 2-75 mm. In at least one embodiment, the length is greater than 75 mm. In at least one embodiment, a distance between adjacent elongated holes ranges from 1-50 mm.

In FIG. 17, the maximum temperature difference ΔTmax along the simulated assembly 1700 is 54° C. Including the elongated holes 1706 decreased the ΔTmax by 9° C. from that of FIG. 16.

The average temperature difference of the assembly 1700 is 48° C. and the average temperature difference of the heat source surface of assembly 1700 is 51° C.

Reducing the ΔTmax increases the lifetime of the LED components by thousands of hours.

Figure 18:
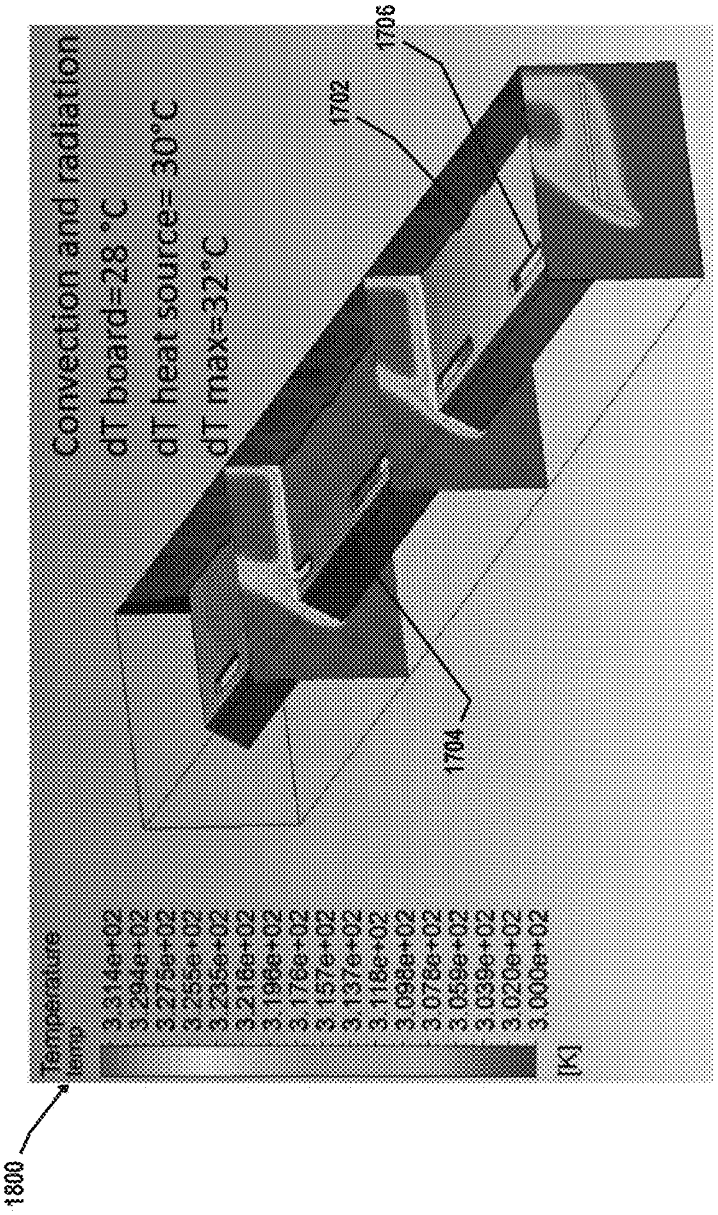
FIG. 18 is another perspective view of a thermal imaged simulation of a PCBA LED light assembly, in accordance with some embodiments.

FIG. 18 is another perspective view of a thermal imaged simulation of a portion of a PCBA LED light assembly, in accordance with some embodiments.

FIG. 18 has the same configuration as FIG. 17. In FIG. 18, the simulation includes the impact of radiation thermal energy transfer from the assembly 1800.

In FIG. 18, the maximum temperature difference ΔTmax along the simulated assembly 1800 is 32° C. Including the benefits of radiated thermal transfer decreased the ΔTmax by 22° C. from that of FIG. 17.

The average temperature difference of the assembly 1800 is 28° C. and the average temperature difference of the heat source surface of assembly 1800 is 30° C.

Reducing the ΔTmax increases the lifetime of the LED components by multiple thousands of hours.

Figure 19:
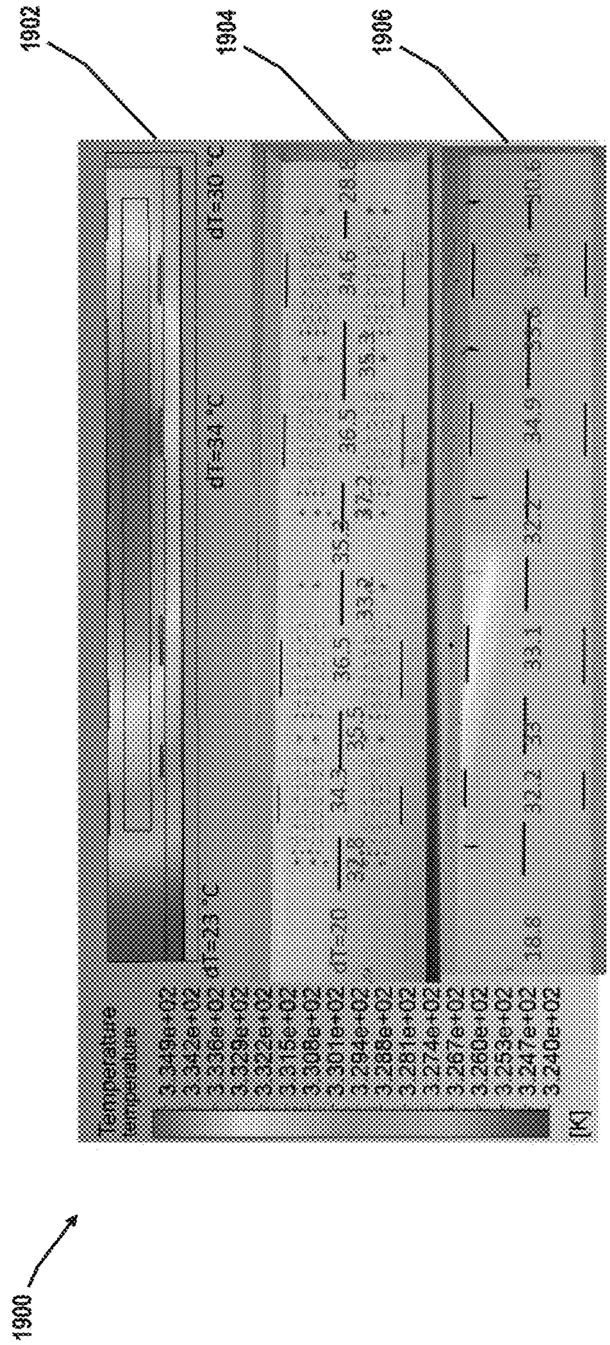
FIG. 19 is a comparison of a thermal imaged simulation of a PCBA LED light assembly with an experimental result of thermally imaging a PCBA LED light assembly, in accordance with some embodiments.

FIG. 19 is a comparison of a thermal imaged simulation of a portion of a PCBA LED light assembly with an experimental result of thermally imaging a PCBA LED light assembly, in accordance with some embodiments.

The upper portion 1902 of FIG. 19 is a thermal map of a top view of a quarter of the assembly surface. The middle portion 1904 of FIG. 19 is experimental temperature readings measuring the temperature of the component surface (e.g., component side 627) of the assembly. The lower portion 1906 of FIG. 19 is experimental temperature readings measuring the temperature of the non-component surface (e.g., non-populated side 629) of the assembly. As depicted, the experimental measurements substantially correspond with the simulated thermal measurements.

In some embodiments, a light fixture includes a printed circuit board (PCB) extending in a first direction, the PCB includes bends along one or more sides extending in the first direction for rigidity, wherein the PCB is free from a heat sink; one or more groups of a first set of light emitting diodes (LEDs) operatively coupled to a component-side of the PCB; and one or more groups of a second set of LEDs operatively coupled to the component-side of the PCB; wherein each group of the first set of LEDs are non-linearly distanced from each group of the second set of LEDs to prevent thermal runaway.

In some embodiments, the light fixture further includes an LED pattern corresponding to a 2-7-2-7-2 pattern, wherein a first group of two of the first set of LEDS is electrically connected in series with a first group of seven of the second set of LEDS electrically connected in series with a second group of two of the first set of LEDS electrically connected to a second group of seven of the second set of LEDS electrically connected to a third group of two of the first set of LEDS.

In some embodiments, the light fixture further includes a first group of the second set of LEDs, where each LED in the first group of the second set LEDs are in series with one another; a first group of the first set of LEDs, where each LED in the first group of the first set of LEDs are in series with one another; and one or more additional groups the first set of LEDs, where each LED in each group of the one or more additional groups of the first set of LEDs are in series with one another and each group of the one or more additional groups of the first set of LEDs are in parallel with the first group of the first set of LEDs.

In some embodiments, the light fixture further includes a heat pipe operably connected to a non-component side of the PCB, the heat pipe configured to wick away heat pooled in a zone of the non-component side of the PCB to the one or more sides of the PCB.

In some embodiments, the PCB is a first PCB and the heat pipe is a first heat pipe, the light fixture further includes a second PCB extending in the first direction, the second PCB configured to be bent along one or more sides extending in the first direction for rigidity, wherein the second PCB is free from a heat sink; a second heat pipe operably connected to a non-component side of the second PCB, the second heat pipe configured to wick away heat; wherein the first heat pipe extends past a first side of the first PCB towards the second PCB and the second PCB heat pipe extends past a first side of the second PCB towards the first PCB where the first heat pipe is offset from the second heat pipe such that the first and second PCB heat pipe are adjacent to one another.

In some embodiments, the light fixture further includes one or more elongated holes extending from the component-side of the PCB to a non-component side of the PCB.

In some embodiments, each of the one or more elongated holes are located along a centerline of the PCB or adjacent to the one or more groups of the first or the second set of LEDs.

In some embodiments, the light fixture further includes one or more bends along the first direction of the PCB extending longitudinally along the PCB in the first direction.

In some embodiments, a light fixture includes a printed circuit board (PCB) extending in a first direction, the PCB includes a first bend on a first side of the PCB that extends in the first direction; a first wing portion extending from the first bend away from a non-component plane of the PCB toward a component plane of the PCB; a second bend on a second side of the PCB that extends in the first direction; and a second wing portion extending from the second bend away from the non-component plane of the PCB toward the component plane of the PCB; wherein the component plane of the PCB is free from a cover; one or more groups of full spectrum wavelength (LEDs) operatively connected to a component-side of the PCB; and one or more groups of monochromatic wavelength LEDs operatively connected to the component-side of the PCB; wherein the full spectrum wavelength LEDs are non-linearly distanced from the monochromatic wavelength LEDs to prevent thermal runaway.

In some embodiments, the light fixture further includes a pattern of the one or more groups of monochromatic wavelength LEDs and the one or more groups of full spectrum wavelength LEDs corresponding to a first set of 2 monochromatic wavelength LEDs electrically connected in series with a first set of 7 full spectrum wavelength LEDs connected in series with a second set of 2 monochromatic wavelength LEDs electrically connected in series with a second set of 7 full spectrum wavelength LEDs connected in series with a third set of 2 monochromatic wavelength LEDs.

In some embodiments, the light fixture further includes one or more additional groups of full spectrum wavelength LEDs, where each LED in each group of the one or more additional groups of full spectrum wavelength LEDs are in series with one another and each group of the one or more additional groups of full spectrum wavelength LEDs are in parallel with one or more of the first or the second set of full spectrum wavelength LEDs.

In some embodiments, the light fixture further includes a heat pipe operably connected to a non-component side of the PCB, the heat pipe configured to wick away heat pooled in a zone of the non-component side of the PCB to one of the first or second sides of the PCB.

In some embodiments, the PCB is a first PCB and the heat pipe is a first heat pipe, the light fixture further includes a second PCB extending in the first direction; and a second heat pipe operably connected to a non-component side of the second PCB, the second heat pipe configured to wick away heat; wherein the first heat pipe extends past a first side of the first PCB towards the second PCB and the second PCB heat pipe extends past a first side of the second PCB towards the first PCB where the first heat pipe is offset from the second heat pipe such that the first and second PCB heat pipe are adjacent to one another.

In some embodiments, the light fixture further includes one or more circular holes extending from the component-side of the PCB to a non-component side of the PCB.

In some embodiments, the light fixture further includes one or more elongated holes extending in the first direction, the one or more elongated holes including: a first set of holes extending along a midline of the PCB; and a second set of holes extending along the first or second wing portion.

In some embodiments, the first and the second wing portions include extend at an angle inward toward the component side of the PCB, wherein the angle is greater than 10°, but less than 90°.

In some embodiments, a light fixture, includes a printed circuit board (PCB) extending in a first direction, the PCB includes one or more sides bent longitudinally in the first direction for rigidity, wherein the PCB is free from a heat sink, the PCB includes one or more holes extending from a non-component plane to a component plane; one or more groups of white light emitting diodes (LEDs) operatively connected to a component-side of the PCB; and one or more groups of color LEDs operatively connected to the component-side of the PCB; wherein the white LEDs are distanced from the color LEDs at non-linear distances to prevent thermal runaway; wherein the one or more holes provide natural convection air flow through the PCB when the one or more groups of white and color LEDs are producing heat during operation.

In some embodiments, the light fixture further includes a pattern of the one or more groups of color LEDs and the one or more groups of white LEDs corresponding to a 2-7-2-7-2 pattern, wherein each group with 2 LEDs are color LEDs and each group with 7 LEDs are white LEDs.

In some embodiments, the light fixture further includes a first group of color LEDs, where each LED in the first group of color LEDs are in series with one another; a first group of white LEDs, where each LED in the first group of white LEDs are in series with one another; and one or more additional groups of white LEDs, where each LED in each group of the one or more additional groups of white LEDs are in series with one another and each group of the one or more additional groups of white LEDs are in parallel with the first group of white LEDs.

In some embodiments, the light fixture further includes a heat pipe operably connected to a non-component side of the PCB, the heat pipe configured to wick away heat pooled in a zone of the non-component side of the PCB to the one or more sides of the PCB.

One general aspect includes a light fixture. The light fixture includes a printed circuit board (PCB) extending in a first direction, the PCB includes bends along one or more sides extending in the first direction for rigidity; the PCB configured to transfer thermal heat directly to ambient air; and one or more groups of light emitting diodes (LEDs) operatively coupled to a component-side of the PCB and between the bends.

Implementations may include one or more of the following features. The light fixture may include: one or more elongated holes extending through the PCB, the one or more elongated holes longitudinally extending in the first direction, the one or more elongated holes between the bends and the one or more groups of the LEDs, and where the one or more elongated holes provide natural convection air flow through the PCB when the one or more groups of the LEDs are producing heat during operation. A length of each of the one or more elongated holes ranges from 2-75 mm. A width of each of the one or more elongated holes ranges from 1-30 mm. A distance in a second direction from a bend to at least one of the one or more elongated holes ranges from 1-10 mm. A distance in the first direction between adjacent holes of the one or more elongated holes ranges from 1-50 mm. Each of the one or more elongated holes is substantially spaced away from a cluster of LEDs of the one or more groups of LEDs. The light fixture may include: one or more centerline holes extending through the PCB, the one or more centerline holes longitudinally extending in the first direction along a centerline of the PCB. The light fixture may include: one or more centerline holes extending through the PCB, the one or more centerline holes longitudinally extending in the first direction along a centerline of the PCB. The one or more centerline holes are elongated holes. The bent portion of the PCB distal from the one or more groups of LEDs has a width ranging from 1-50 mm. The bent portion of the PCB distal from the one or more groups of LEDs extends at an angle ranging from 10-90 degrees from the portion of the PCB having the one or more groups of LEDs. The bend extends along the entirety of the PCB in the first direction. A distance between each bend and at least one of the one or more groups of LEDs ranges from 15-10 mm. The PCB is free from a heat sink. The PCB has a non-component side and the non-component side is configured to transfer thermal heat directly to ambient air. Both sides of the PCB are configured to transfer thermal heat directly to ambient air. The PCB is free from thermal interface material.

One general aspect includes a method of assembling a light generating device. The method also includes routing one or more holes in a PCB. The method also includes populating one or more led components on a surface of the PCB after routing the one or more holes. The method also includes bending the PCB to form one or more bends extending longitudinally along the PCB after routing the one or more holes.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A light fixture, comprising:

a printed circuit board (PCB) extending in a first direction, the PCB includes bends along one or more sides extending in the first direction for rigidity; the PCB configured to transfer thermal heat directly to ambient air; the PCB having one or more centerline holes defined therein and extending through the PCB; and one or more groups of light emitting diodes (LEDs) operatively coupled to a component-side of the PCB and between the bends, wherein the one or more centerline holes are aligned along a line extending in the first direction, wherein the one or more groups of LEDs are co-planar, and wherein the bent PCB is concave toward the component-side of the PCB.

2. The light fixture of claim 1, wherein a length of each of the one or more centerline holes ranges from 2-75 mm.

3. The light fixture of claim 1, wherein a width of each of the one or more centerline holes ranges from 1-30 mm.

4. The light fixture of claim 1, wherein a distance in a second direction from a bend to at least one of the one or more centerline holes ranges from 1-10 mm.

5. The light fixture of claim 1, wherein a distance in the first direction between adjacent holes of the one or more centerline holes ranges from 1-50 mm.

6. The light fixture of claim 1, wherein each of the one or more centerline holes is substantially spaced away from a cluster of LEDs of the one or more groups of LEDs.

7. The light fixture of claim 1, wherein the one or more centerline holes are elongated holes.

8. The light fixture of claim 1, wherein the one or more centerline holes longitudinally extend in the first direction along a centerline of the PCB.

9. The light fixture of claim 1, wherein the bent portion of the PCB distal from the one or more groups of LEDs has a width ranging from 1-50 mm.

10. The light fixture of claim 1, wherein the bent portion of the PCB distal from the one or more groups of LEDs extends at an angle ranging from 10-90 degrees from the portion of the PCB having the one or more groups of LEDs.

11. The light fixture of claim 1, wherein the bend extends along the entirety of the PCB in the first direction.

12. The light fixture of claim 1, wherein a distance between each bend and at least one of the one or more groups of LEDs ranges from 1-10 mm.

13. The light fixture of claim 1, wherein the PCB has a non-component side and the non-component side is configured to transfer thermal heat directly to ambient air.

14. The light fixture of claim 13, wherein both sides of the PCB are configured to transfer thermal heat directly to ambient air.

15. The light fixture of claim 1, wherein the PCB includes a high emissivity coating on a side opposite the component side.

16. The light fixture of claim 1, wherein the PCB includes a heat pipe operably connected to a side opposite the component side.

17. A light fixture, comprising:

a printed circuit board (PCB) extending in a first direction, the PCB includes bends along one or more sides extending in the first direction for rigidity; the PCB configured to transfer thermal heat directly to ambient air; the PCB having one or more holes defined therein and extending through the PCB; and one or more groups of light emitting diodes (LEDs) operatively coupled to a component-side of the PCB and between the bends;

wherein the one or more holes are between the bends and the one or more groups of the LEDs, and wherein the one or more holes provide natural convection air flow through the PCB when the one or more groups of the LEDs are producing heat during operation, wherein the one or more groups of LEDs are co-planar, and wherein the bent PCB is concave toward the component-side of the PCB.

18. The light fixture of claim 17, wherein one or more of the one or more holes are elongated holes.

19. The light fixture of claim 17, wherein the one or more holes are arranged along the first direction.

* * * * *